(12) United States Patent
Heo et al.

(10) Patent No.: US 12,389,133 B2
(45) Date of Patent: Aug. 12, 2025

(54) METHOD AND APPARATUS FOR PROCESSING ARRAY IMAGE

(71) Applicant: SAMSUNG ELECTRONICS CO., LTD., Suwon-si (KR)

(72) Inventors: Jingu Heo, Suwon-si (KR); Byong Min Kang, Suwon-si (KR); Juyong Park, Suwon-si (KR); Dong Kyung Nam, Suwon-si (KR); Yang Ho Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 143 days.

(21) Appl. No.: 18/376,280

(22) Filed: Oct. 3, 2023

(65) Prior Publication Data

US 2024/0187746 A1 Jun. 6, 2024

(30) Foreign Application Priority Data

Oct. 21, 2022 (KR) .................. 10-2022-0136751

(51) Int. Cl.
*H04N 23/957* (2023.01)
*H04N 23/65* (2023.01)
*H04N 23/667* (2023.01)
*H04N 23/84* (2023.01)
*H04N 23/951* (2023.01)

(52) U.S. Cl.
CPC ......... *H04N 23/957* (2023.01); *H04N 23/651* (2023.01); *H04N 23/667* (2023.01); *H04N 23/843* (2023.01); *H04N 23/951* (2023.01)

(58) Field of Classification Search
None
See application file for complete search history.

(56) References Cited

U.S. PATENT DOCUMENTS

| | | |
|---|---|---|
| 9,235,898 B2 | 1/2016 | Venkataraman et al. |
| 9,503,699 B2 | 11/2016 | Kawaguchi et al. |
| 9,576,369 B2 | 2/2017 | Venkataraman et al. |
| 11,184,553 B1 * | 11/2021 | Liu ........................ H04N 23/84 |
| 11,323,640 B2 | 5/2022 | Kim et al. |
| 11,381,743 B1 | 7/2022 | Mahbub et al. |

(Continued)

FOREIGN PATENT DOCUMENTS

| | | |
|---|---|---|
| JP | 2001-24924 A | 1/2001 |
| JP | 2010-10881 A | 1/2010 |
| KR | 10-2019-0139788 A | 12/2019 |

*Primary Examiner* — Paul M Berardesca
(74) *Attorney, Agent, or Firm* — Sughrue Mion, PLLC

(57) ABSTRACT

An image processing method includes: based on an imaging device generating an input array image of a multi-view through an array lens, determining a first setting parameter indicating whether to use the multi-view or a single view selected from the multi-view; determining a second setting parameter indicating whether a priority is assigned to sensitivity enhancement based on pixel binning or to resolution enhancement based on pixel interpolation; determining an image processing mode based on the first setting parameter and the second setting parameter; and generating an output image by performing image processing on the input array image based on a processing procedure that is based on the determined image processing mode.

20 Claims, 16 Drawing Sheets

(56) References Cited

U.S. PATENT DOCUMENTS

| | | | |
|---|---|---|---|
| 2015/0070474 A1* | 3/2015 | Bhat | G02B 27/0075 |
| | | | 348/49 |
| 2018/0180836 A1* | 6/2018 | Huang | G02B 7/04 |
| 2021/0067749 A1* | 3/2021 | Yadav | H04N 25/135 |
| 2022/0182589 A1* | 6/2022 | Sun | G06T 3/4015 |
| 2022/0210378 A1* | 6/2022 | Tseng | H04N 23/843 |
| 2023/0060314 A1 | 3/2023 | Kang et al. | |
| 2024/0112440 A1 | 4/2024 | Heo et al. | |

\* cited by examiner

METHOD AND APPARATUS FOR PROCESSING ARRAY IMAGE

CROSS-REFERENCE TO RELATED APPLICATIONS

This application claims the benefit under 35 USC § 119(a) of Korean Patent Application No. 10-2022-0136751, filed on Oct. 21, 2022, in the Korean Intellectual Property Office, the entire disclosure of which is incorporated herein by reference for all purposes.

BACKGROUND

1. Field

The following description relates to a method and apparatus for processing an array image.

2. Description of Related Art

Due to the development of optical technology and image processing technology, image capturing devices are utilized in a wide range of fields such as multimedia content production, security, and object recognition. For example, a capturing device may be mounted on a mobile device, a camera, a vehicle, or a computer to capture an image, recognize an object, or obtain data for controlling a device. The volume of the capturing device may be determined based on the size of a lens, the focal length of the lens, and the size of a sensor. When the volume of the capturing device is limited, a long focal length may be provided in a limited space by transforming a lens structure.

SUMMARY

This section is provided to introduce a selection of concepts in a simplified form that are further described below in the Detailed Description. This section is not intended to identify key features or essential features of the claimed subject matter, nor is it intended to be used as an aid in determining the scope of the claimed subject matter.

An image processing method may include: based on an imaging device generating an input array image of a multi-view through an array lens, determining a first setting parameter indicating whether to use the multi-view or a single view selected from the multi-view; determining a second setting parameter indicating whether a priority is assigned to sensitivity enhancement based on pixel binning or to resolution enhancement based on pixel interpolation; determining an image processing mode based on the first setting parameter and the second setting parameter; and generating an output image by performing image processing on the input array image based on a processing procedure that is based on the determined image processing mode.

The determined image processing mode may include: a first mode that is determined when the first setting parameter indicates to use the multi-view and the second setting parameter indicates the priority is assigned to the resolution enhancement, a second mode that is determined when the first setting parameter indicates to use the multi-view and the second setting parameter indicates the priority is assigned to the sensitivity enhancement, a fourth mode that is determined when the first setting parameter indicates to use the single view and the second setting parameter indicates the priority is assigned to the resolution enhancement, or a fifth mode that is determined when the first setting parameter indicates to use the single view and the second setting parameter indicates the priority is assigned to the sensitivity enhancement.

The processing procedure that is based on the first mode may include sub stages. The processing procedure that is based on the second mode, the fourth mode, or the fifth mode may only include some of the sub stages.

The sub stages may include: a first sub stage for performing demosaicing on raw data, a second sub stage for performing upsampling for resolution enhancement, a third sub stage for generating matching information of the multi-view, and a fourth sub stage for generating a synthesized image using the matching information.

The processing procedure that is based on the second mode may not include the first sub stage and the second sub stage. The processing procedure that is based on the fourth mode may not include the third sub stage and the fourth sub stage. The processing procedure that is based on the fifth mode may not include the second sub stage, the third sub stage, and the fourth sub stage.

The image processing method may further include: determining a third setting parameter indicating whether to use hardware logic-based binning processing. The determining the image processing mode may be further based on the third setting parameter.

The determined image processing mode may include: a first mode that is determined when the first setting parameter indicates to use the multi-view, the third setting parameter indicates to not use the hardware logic-based binning processing, and the second setting parameter indicates the priority is assigned to the resolution enhancement, a second mode that is determined when the first setting parameter indicates to use the multi-view, the third setting parameter indicates to not use the hardware logic-based binning processing, and the second setting parameter indicates the priority is assigned to the sensitivity enhancement, a third mode that is determined when the first setting parameter indicates to use the multi-view and the third setting parameter indicates to use the hardware logic-based binning processing, a fourth mode that is determined when the first setting parameter indicates to use the single view, the third setting parameter indicates to not use the hardware logic-based binning processing, and the second setting parameter indicates the priority is assigned to the resolution enhancement, a fifth mode that is determined when the first setting parameter indicates to use the single view, the third setting parameter indicates to not use the hardware logic-based binning processing, and the second setting parameter indicates the priority is assigned to the sensitivity enhancement, and a sixth mode that is determined when the first setting parameter indicates to use the single view and the third setting parameter indicates to use the hardware logic-based binning processing.

The third setting parameter may indicate to use the hardware logic-based binning processing in at least one of a low-illuminance environment or a video capturing mode.

The hardware logic-based binning processing may include: determining initial corresponding pixels between sub images that respectively correspond to different views of the input array image, extracting a refinement target from the initial corresponding pixels based on an intensity difference between the initial corresponding pixels, determining a new corresponding pixel for the refinement target by using a calibration parameter, and performing binning on final corresponding pixels through a weighted average of the final corresponding pixels that are based on the new corresponding pixel.

The first setting parameter may indicate to use the single view in response to a demand for low power.

A non-transitory computer-readable storage medium storing instructions that, when executed by a processor, may cause the processor to perform an image processing method including: based on an imaging device generating an input array image of a multi-view through an array lens, determining a first setting parameter indicating whether to use the multi-view or a single view selected from the multi-view; determining a second setting parameter indicating whether a priority is assigned to sensitivity enhancement based on pixel binning or to resolution enhancement based on pixel interpolation; determining an image processing mode based on the first setting parameter and the second setting parameter; and generating an output image by performing image processing on the input array image based on a processing procedure that is based on the determined image processing mode.

An image processing apparatus may include: a processor; and a memory configured to store instructions executable by the processor. In response to the instructions being executed by the processor, the processor may be configured to: based on an imaging device generating an input array image of a multi-view through an array lens, determine a first setting parameter indicating whether to use the multi-view or a single view selected from the multi-view, determine a second setting parameter indicating whether a priority is assigned to sensitivity enhancement based on pixel binning or to resolution enhancement based on pixel interpolation, determine an image processing mode based on the first setting parameter and the second setting parameter, and generate an output image by performing image processing on the input array image based on a processing procedure that is based on the determined image processing mode.

The determined image processing mode may include: a first mode that is determined when the first setting parameter indicates to use the multi-view and the second setting parameter indicates the priority is assigned to the resolution enhancement, a second mode that is determined when the first setting parameter indicates to use the multi-view and the second setting parameter indicates the priority is assigned to the sensitivity enhancement, a fourth mode that is determined when the first setting parameter indicates to use the single view and the second setting parameter indicates the priority is assigned to the resolution enhancement, or a fifth mode that is determined when the first setting parameter indicates to use the single view and the second setting parameter indicates the priority is assigned to the sensitivity enhancement.

The processing procedure that is based on the first mode may include sub stages. The processing procedure that is based on the second mode, the fourth mode, or the fifth mode may only include some of the sub stages.

The processor may be further configured to: determine a third setting parameter indicating whether to use hardware logic-based binning processing. The processor being configured to determine the image processing mode may be further based on the third setting parameter.

The determined image processing mode may include: a first mode that is determined when the first setting parameter indicates to use the multi-view, the third setting parameter indicates to not use the hardware logic-based binning processing, and the second setting parameter indicates the priority is assigned to the resolution enhancement, a second mode that is determined when the first setting parameter indicates to use the multi-view, the third setting parameter indicates to not use the hardware logic-based binning processing, and the second setting parameter indicates the priority is assigned to the sensitivity enhancement, a third mode that is determined when the first setting parameter indicates to use the multi-view and the third setting parameter indicates to use the hardware logic-based binning processing, a fourth mode that is determined when the first setting parameter indicates to use the single view, the third setting parameter indicates to not use the hardware logic-based binning processing, and the second setting parameter indicates the priority is assigned to the resolution enhancement, a fifth mode that is determined when the first setting parameter indicates to use the single view, the third setting parameter indicates to not use the hardware logic-based binning processing, and the second setting parameter indicates the priority is assigned to the sensitivity enhancement, and a sixth mode that is determined when the first setting parameter indicates to use the single view and the third setting parameter indicates to use the hardware logic-based binning processing.

The third setting parameter may indicate to use the hardware logic-based binning processing in at least one of a low-illuminance environment or a video capturing mode.

The hardware logic-based binning processing may include the processor being configured to: determine initial corresponding pixels between sub images respectively that correspond to different views of the input array image, extract a refinement target from the initial corresponding pixels based on an intensity difference between the initial corresponding pixels, determine a new corresponding pixel for the refinement target by using a calibration parameter, and perform binning on final corresponding pixels through a weighted average of the final corresponding pixels that are based on the new corresponding pixel.

The first setting parameter may indicate to use the single view in response to a demand for low power.

An electronic device may include: an imaging device configured to generate an input array image of a multi-view through an array lens, the input array image comprising sub images corresponding to the multi-view; and a processor configured to: determine a first setting parameter indicating whether to use the multi-view or a single view selected from the multi-view, determine a second setting parameter indicating whether a priority is assigned to sensitivity enhancement based on pixel binning or to resolution enhancement based on pixel interpolation, determine an image processing mode based on the first setting parameter and the second setting parameter, and generate an output image by performing image processing on the input array image based on a processing procedure that is based on the determined image processing mode.

Other features and aspects will be apparent from the following detailed description, the drawings, and the claims.

Figure 1A:
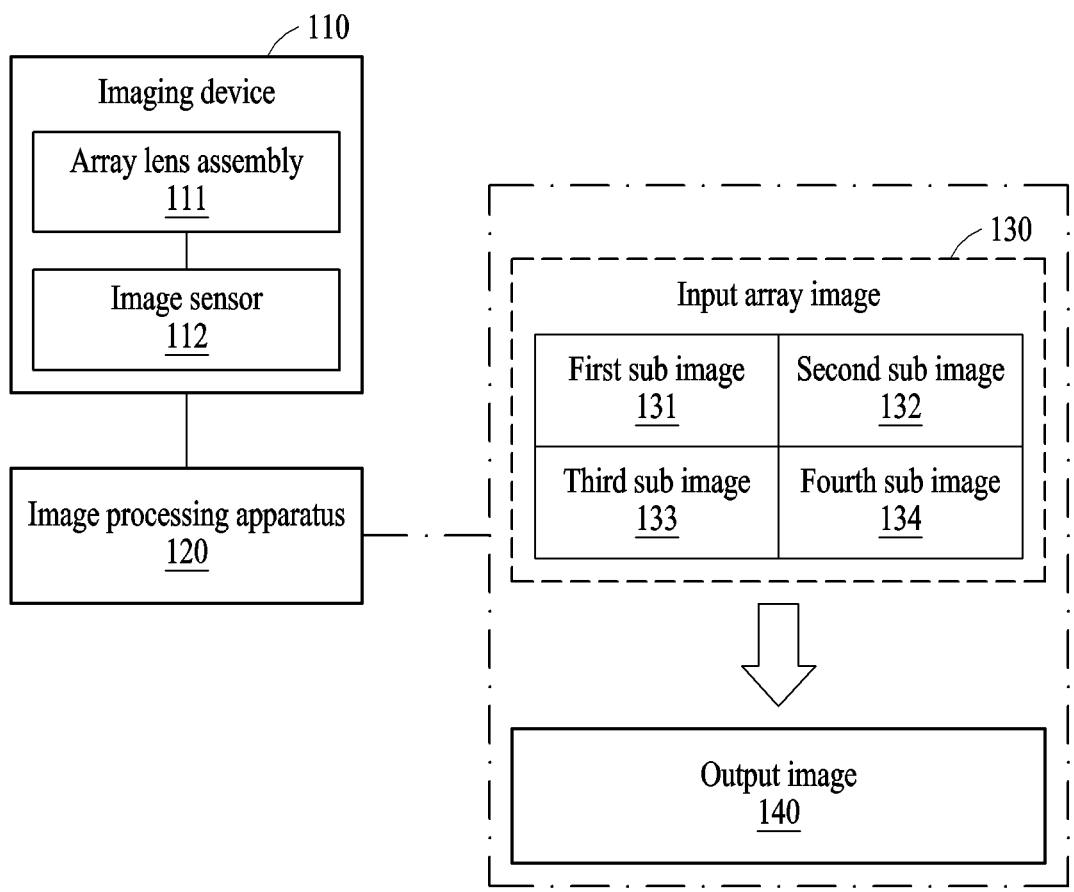
FIG. 1A illustrates an example of configurations and operations of an imaging device and an image processing apparatus, according to one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed structural or functional description is provided as an example only and various alterations and modifications may be made to the examples. The examples are not construed as limited to the disclosure and should be understood to include all changes, equivalents, and replacements within the idea and the technical scope of the embodiments.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

As used herein, "at least one of A and B", "at least one of A, B, or C," and the like, each of which may include any one of the items listed together in the corresponding one of the phrases, or all possible combinations thereof.

Unless otherwise defined, all terms used herein including technical or scientific terms have the same meaning as commonly understood by one of ordinary skill in the art to which examples belong. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like components and a repeated description related thereto will be omitted.

FIG. 1A illustrates an example of configurations and operations of an imaging device and an image processing apparatus, according to one or more embodiments. Referring to FIG. 1A, an imaging device 110 may include an array lens assembly 111 and an image sensor 112. The array lens assembly 111 may include a layer of at least one lens array. Each layer may include a lens array including a plurality of individual lenses. For example, a lens array may include individual lenses arranged in, for example, a 2*2 array or a 3*3 array. Each layer may include the same lens arrangement.

The image sensor 112 may be a single image sensor or multiple image sensors provided in a number corresponding to the lens arrangement. The image sensor 112 may generate an input array image 130. The input array image 130 may include sub images 131 to 134 based on the lens arrangement of the array lens assembly 111. The sub images 131 to 134 in a 2*2 arrangement are based on an assumption that the array lens assembly 111 has a 2*2 lens arrangement. Hereinafter, an example of the array lens assembly 111 in the 2*2 lens arrangement is described. However, the lens arrangement of the array lens assembly 111 is not limited to 2*2.

An image processing apparatus 120 may generate an output image 140 based on the sub images 131 to 134. In an example, the image processing apparatus 120 may use the sub images 131 to 134 as a whole. The image processing apparatus 120 may generate an output image 140 by merging the sub images 131 to 134. Merging may include binning-based merging and remosaic-based merging. Binning-based merging may improve sensitivity. Remosaic-based merging may improve resolution. For example, the output image 140 by remosaic-based merging may have four times the resolution of each of the sub images 131 to 134. According to an example, the image processing apparatus 120 may partially use the sub images 131 to 134. For example, the image processing apparatus 120 may select a sub image (e.g., the sub image 131) of a view from the sub images 131 to 134 of a multi-view and may generate the output image 140 from the selected sub image (e.g., the sub image 131).

As the multi-view, the single view, binning-based merging, and remosaic-based merging, various options may exist in the process of deriving the output image 140 from the input array image 130. The image processing apparatus 120 may process the input array image 130 with an appropriate option by considering various factors, such as user settings, a system status, and a capture status. Various options may be parameterized by setting parameters, and image processing modes may be defined based on parameter values of the setting parameters. The image processing apparatus 120 may process the input array image 130 with an image processing mode based on parameter values of setting parameters.

Figure 1B:
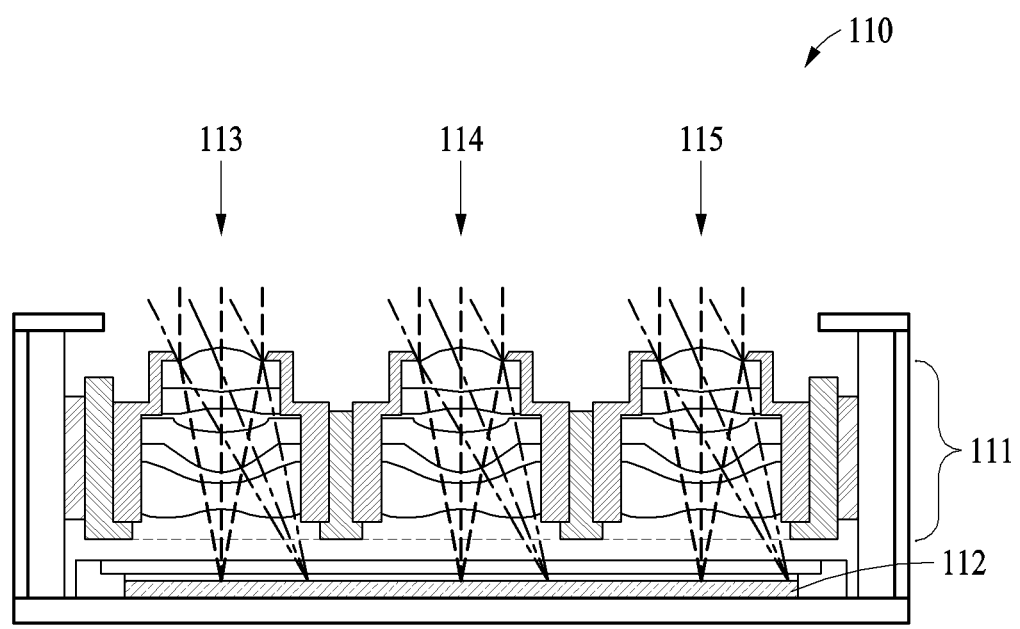
FIG. 1B illustrates an example of a configuration of the imaging device, according to one or more embodiments.

FIG. 1B illustrates an example of a configuration of the imaging device, according to one or more embodiments. Referring to FIG. 1B, the imaging device 110 may include the array lens assembly 111 and the image sensor 112. The imaging device 110 may include a plurality of apertures 113 to 115. The imaging device 110 may generate sub images based on the arrangement of the plurality of apertures 113 to 115. FIG. 1B illustrates an example of a lens arrangement in a 3*3 array type. In this example, 3*3 sub images may be obtained. However, 3*3 is only an example, and a different array type, such as 2*2 may be used. The imaging device 110 may correspond to an array lens device. An array lens technique is a technique for obtaining a plurality of small images having the same angle of view using a camera including a plurality of lenses having a short focal length. The thickness of a camera module may decrease through the array lens technique.

An array lens may be used in various technical fields. The array lens may reduce the size of a camera by dividing a large sensor and a large lens for a large sensor into an array type. For example, when the length (in other words, the height) of a first camera is L based on an assumption that an angle of view is A, a focal length is f, and an image size is D, the length of a second camera based on an assumption that an angle of view is A, a focal length is f/2, and the image size is D/2 may decrease to L/2. The resolution of the second camera may decrease to ¼ compared to the first camera. When the second camera is configured by a 2*2 lens array and one output image is generated, the resolution of the output image may be the same as the first camera. More specifically, 4 sub images may be generated by the 2*2 lens array and an image having the same resolution as the first camera may be derived by synthesizing the four sub images.

Figure 2:
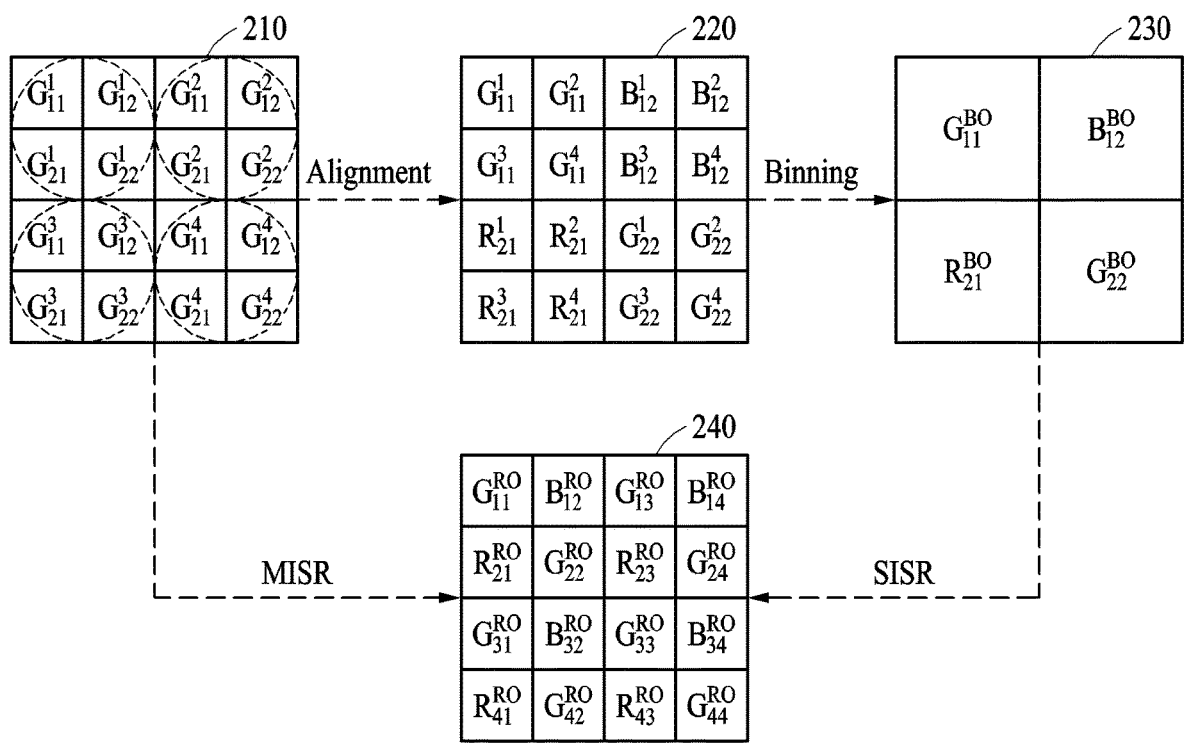
FIG. 2 illustrates an example of a change in pixel data based on image processing, according to one or more embodiments.

FIG. 2 illustrates an example of a change in pixel data based on image processing, according to one or more embodiments. Referring to FIG. 2, an input array image 210 may be generated through an array lens assembly. The input array image 210 may include sub images corresponding to different views. The input array image 210 may include the sub images in the form of raw data. In the raw data, a pixel of each color channel may be arranged in a pattern based on a color filter array (CFA).

The CFA may be arranged between a lens and an image sensor, and a signal of each channel may be separated through the CFA. Hereinafter, an example that the CFA includes a Bayer pattern is described, however, different patterns other than the Bayer pattern may be used. In this example, the input array image 210 may include image data based on an R-G-G-B 2*2 Bayer pattern. As illustrated in FIG. 2, a pixel of each color channel may be represented by $R_{mn}^k$, $G_{mn}^k$, and $B_{mn}^k$. k may denote an identifier of a sub image where each pixel belongs to and m and n may denote an identifier of a location in a sub image where each pixel belongs to. In the images 210 and 220, k=1, k=2, k=3, and k=4 may denote sub images of each view. In images 230 and 240, k=BO may represent a binning result and k=RO may represent a remosaic result.

Result data 220 may be determined through alignment of the input array image 210. Pixels at corresponding positions may be identified through an alignment operation. In the input array image 210, a dashed circle may represent an aperture and a view may vary depending on the aperture. In the input array image 210, pixels at a corresponding position may be spaced apart from each other. Such pixels may be identified through the alignment operation. For example, pixels $G_{11}^1$, $G_{11}^2$, $G_{11}^3$, and $G_{11}^4$ at a corresponding position may be grouped into one group through the alignment operation. Corresponding pixels (e.g., the pixels $G_{11}^1$, $G_{11}^2$, $G_{11}^3$, and $G_{11}^4$) of the same group may be merged into one pixel (e.g., a pixel $G_{11}^{BO}$) of the result data 230 of a binning operation through the binning operation. Such a merging process may be referred to as binning-based merging.

Remosaic-based merging, which is distinguished from the binning-based merging, may exist. Result data 240 may be determined based on remosaic-based merging. According to an example, a temporary restored image of each view may be determined by demosaicing and upsampling a sub image of each view of the input array image 210, and the result data 240 may be determined through merging the temporary restored image of each view. The result data 240 of the remosaic-based merging may have an enhanced resolution compared to each sub image of the input array image 210.

In the remosaic operation, multi-view images, such as the input array image 210, or a single view image, such as the result data 240, may be used as an input. When multi-view images are used as inputs, the remosaic operation may be referred to as multi image super resolution (MISR). When a single view image is used as an input, a merging operation may be referred to as single image super resolution (SISR). MISR may require a merging operation of corresponding pixels of multi-view images. However, since corresponding pixels do not exist in a single view image, SISR may not require the merging operation. Although FIG. 2 illustrates an example of performing SISR from the result data 230, SISR may be performed from a sub image of any single view of the input array image 210.

Figure 3:
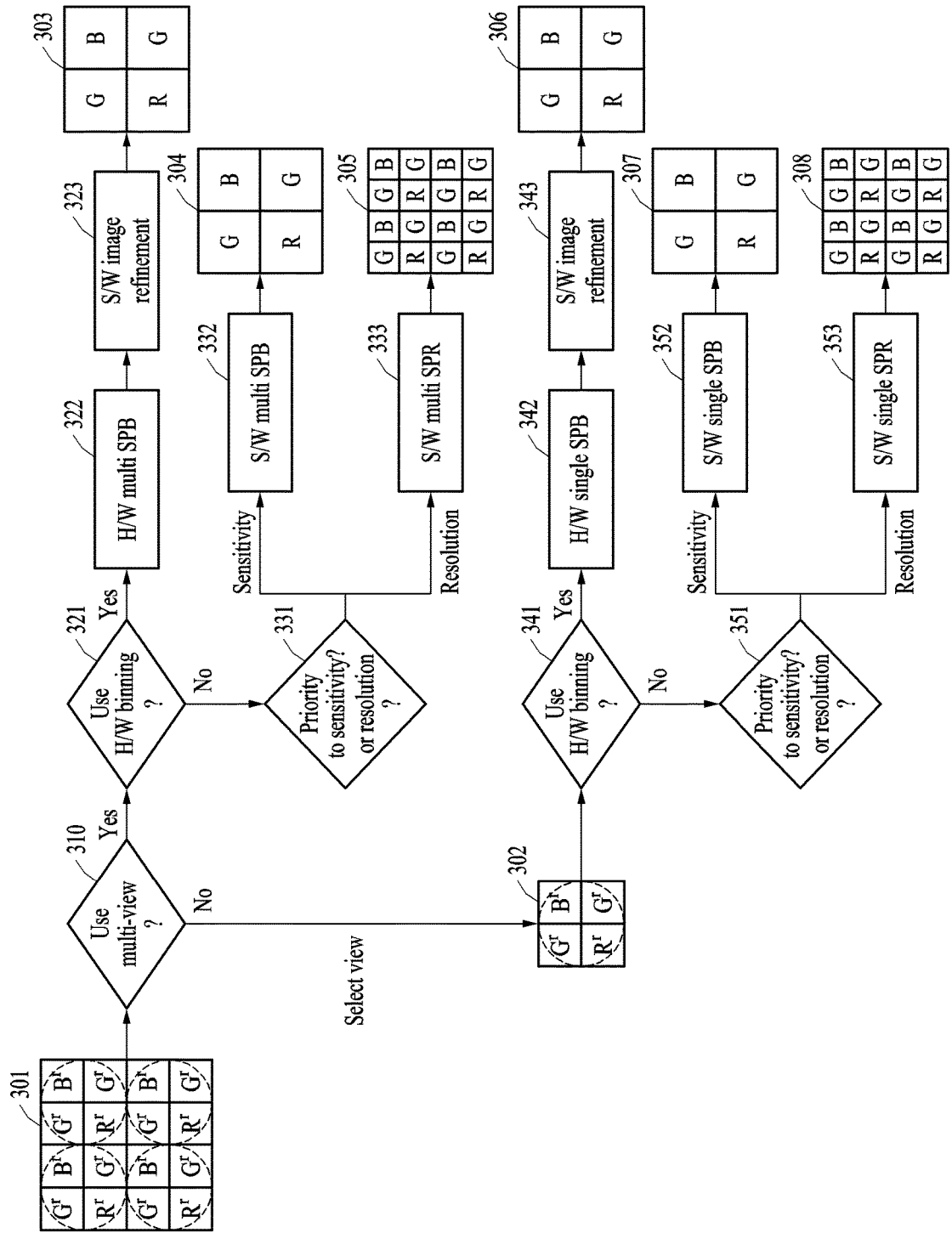
FIG. 3 illustrates an example of a process of determining an image processing mode and a result of each image processing mode, according to one or more embodiments.

FIG. 3 illustrates an example of a process of determining an image processing mode and a result of each image processing mode, according to one or more embodiments. Referring to FIG. 3, various processing options of an input array image 301 may be determined and the input array image 301 may be processed based on the processing options. The processing options may be determined through setting parameters. For example, the setting parameters may include at least one of a first setting parameter indicating whether to use a multi-view or a single view, a second setting parameter indicating whether a priority is assigned to sensitivity enhancement based on pixel binning or to resolution enhancement based on pixel interpolation, and a third setting parameter indicating whether hardware (H/W) logic-based binning processing is used.

When the first setting parameter instructs to use the multi-view, image processing of the input array image 301 may be performed through any one of H/W multi spread pixel binning (SPB), software (S/W) multi SPB, and S/W multi spread pixel remosaic (SPR). When the second setting parameter instructs to use the single view, image processing of the input array image 301 may be performed through any one of H/W single SPB, S/W single SPB, and S/W single SPR. The S/W multi SPR may be referred to as a first image processing mode or a first mode, the S/W multi SPB may be referred to as a second image processing mode or a second mode, the H/W multi SPB may be referred to as a third image processing mode or a third mode, the S/W single SPR may be referred to as a fourth image processing mode or a fourth mode, the S/W single SPB may be referred to as a fifth image processing mode or a fifth mode, and the H/W single SPB may be referred to as a sixth image processing mode or a sixth mode. In each of the image processing modes, image processing may be performed based on setting parameters of each of the image processing modes.

SP in the terms SPB and SPR may represent that corresponding pixels are dispersed. In the case of a tetra-cell, 2*2 corresponding pixels may form one pixel group. In the case of a nona-cell, 3*3 corresponding pixels may form one pixel group and in the case of a chameleon-cell, 4*4 corresponding pixels may form one pixel group. In addition, various cell types may exist. Unlike the tetra-cell, the nona-cell, and the chameleon-cell, corresponding pixels are dispersed in the input array image 301. For binning or remosaicing the dispersed pixels, a technique that is different from binning and remosaicing of neighboring pixels, such as the nona-cell, may be applied.

Through operations 310, 321, 331, 341, and 351, a parameter value and an image processing mode may be determined. In operation 310, whether a multi-view is used may be determined. Through operation 310, the first setting parameter indicating whether to use a multi-view or a single view may be determined. When a parameter value of the first setting parameter is set to use the multi-view, operation 321 may be performed. The multi-view may help improve image quality, however, power consumption may increase while processing the multi-view. When there is a demand for low power, a single view may be used. For example, based on user settings or system requirements, the demand for low power may arise. For example, a user who desires to minimize power consumption and use a battery for a long time may reflect the demand for low power in the system setting. For example, when management of power consumption is required, such as when a battery level drops below a threshold, the system may generate the demand for low power.

In operation 321, whether H/W binning is used may be determined. Through operation 321, the third setting parameter indicating whether H/W logic-based binning processing is used may be determined. H/W logic-based binning processing may be used based on a lighting state or a video capture state. For example when the input array image 301 is captured in a low-illuminance environment or the input array image 301 corresponds to a video frame based on video capturing, the third setting parameter may be determined to use H/W logic-based binning processing. H/W logic-based binning processing may be performed through a H/W logic. The H/W logic may be configured to perform a binning operation in a relatively lightweight manner.

When a parameter value of the third setting parameter is set to use the H/W logic, operation 322 may be performed. In operation 322, H/W multi SPB may be performed based on the third image processing mode. S/W image enhancement of operation 323 may be performed, as necessary. Result data 303 may be generated based on image processing of the third image processing mode. Post-processing may be applied to the result data 303, as necessary. As a result of post-processing, an output image based on the result data 303 may be determined. When a parameter value of the third setting parameter is set to not use the H/W logic, operation 331 may be performed.

In operation 331, whether a priority is assigned to sensitivity or resolution may be determined. Through operation 331, the second setting parameter indicating whether the priority is assigned to sensitivity enhancement based on pixel binning or to resolution enhancement based on pixel interpolation may be determined. When the priority is assigned to the sensitivity, sensitivity enhancement using pixel binning may be performed. In this case, pixel binning may be performed based on S/W and may be distinguished from H/W-based binning processing. The priority may be determined based on user settings or system requirements. For example, when a user prefers an image with low noise, the user may assign the priority to sensitivity through user settings and when a user prefers a high-resolution image, the user may assign the priority to resolution through user settings. For example, the user settings may be controlled through a capture option. For example, the system may adjust the priority based on a lighting state. For example, the system may assign the priority to resolution in an environment with sufficient light and may assign the priority to sensitivity in an environment with insufficient light.

When the priority is assigned to sensitivity, S/W multi SPB based on the second image processing mode may be performed in operation 332. S/W multi SPB may more delicately perform binning compared to H/W multi SPB. For example, a delicate operation may be applied to a process of calculating corresponding pixels, a filtering process, and the like. Result data 304 may be generated based on image processing of the second image processing mode. Post-processing may be applied to the result data 304 as necessary and an output image based on the result data 304 may be determined. When the priority is assigned to resolution, S/W multi SPR may be performed based on the first image processing mode in operation 333. Result data 305 may be generated based on image processing of the first image processing mode. Post-processing may be applied to the result data 305 as necessary and an output image based on the result data 305 may be determined. Resolution enhancement may be performed through upsampling or super resolution (SR) of S/W multi SPR. The result data 305 may have a higher resolution than the result data 303 and the result data 304. For example, the resolution of the result data 305 may be enhanced by four times.

When a parameter value of the first setting parameter is set to use a single view, operation 341 may be performed. A single view image 302 to be used for generating an output image may be selected from the input array image 301. The single view image 302 may correspond to a sub image of a single view among multi-view sub images of the input array image 301. For example, the single view image 302 may be selected based on a user selection, random selection, image quality, and the like. For example, a sub image of a view having the smallest defect or distortion may be selected to be the single view image 302.

In operation 341, whether H/W binning is used may be determined. Through operation 341, the third setting parameter indicating whether H/W logic-based binning processing is used may be determined. H/W logic-based binning processing may be used based on a lighting state or a video capture state. H/W logic-based binning processing may be performed through a H/W logic. The H/W logic may be configured to perform a binning operation in a relatively lightweight manner.

When a parameter value of the third setting parameter is set to use the H/W logic, operation 342 may be performed.

In operation 342, H/W single SPB may be performed based on the sixth image processing mode. Different H/W logics may be used for H/W multi SPB and H/W single SPB. For example, a H/W logic of H/W multi SPB may search for corresponding pixels from multi-view sub images of the input array image 301 and may perform binning of the corresponding pixels. For example, the H/W logic of H/W single SPB may perform filtering (e.g., self bilateral filtering) on the single view image 302. S/W image enhancement of operation 343 may be performed, as necessary. Result data 306 may be generated based on image processing of the fourth image processing mode. Post-processing may be applied to the result data 306, as necessary. As a result of post-processing, an output image based on the result data 306 may be determined.

When a parameter value of the third setting parameter is set to not use the H/W logic, operation 351 may be performed. In operation 351, whether a priority is assigned to sensitivity or resolution may be determined. Through operation 351, the second setting parameter indicating whether the priority is assigned to sensitivity enhancement based on pixel binning or to resolution enhancement based on pixel interpolation may be determined. When the priority is assigned to the sensitivity, sensitivity enhancement using S/W-based pixel binning may be performed.

When the priority is assigned to sensitivity, S/W single SPB based on the fifth image processing mode may be performed in operation 342. S/W single SPB may more delicately perform binning compared to H/W single SPB. For example, demosaicing based on region of interest (ROI) detection may be added. Result data 307 may be generated through the fifth image processing mode. Post-processing may be applied to the result data 307 as necessary, and an output image based on the result data 307 may be determined. When the priority is assigned to resolution, S/W single SPR may be performed based on the fourth image processing mode in operation 353. Result data 308 may be generated through the fourth image processing mode. Post-processing may be applied to the result data 308 as necessary, and an output image based on the result data 308 may be determined. Resolution enhancement may be achieved through upsampling or SR of S/W single SPR. The result data 308 may have a higher resolution than the result data 306 and the result data 307. For example, the resolution of the result data 308 may be enhanced by four times. The result data 308 may have the same resolution as the result data 305.

A processing procedure of the first image processing mode may include a plurality of sub stages. For example, the sub stages may include a first sub stage for performing demosaicing on raw data, a second sub stage for performing upsampling for resolution enhancement, a third sub stage for generating matching information of the multi-view, and a fourth sub stage for generating a synthesized image using the matching information. Each processing procedure of the second image processing mode, the fourth image processing mode, and the fifth image processing mode may include some of the sub stages. For example, in the processing procedure of the second image processing mode, the first sub stage and the sub second stage may be excluded. For example, in the processing procedure of the fourth image processing mode, the third sub stage and the fourth sub stage may be excluded. For example, in the processing procedure of the fifth image processing mode, the second sub stage, third sub stage, and the fourth sub stage may be excluded.

Figure 4:
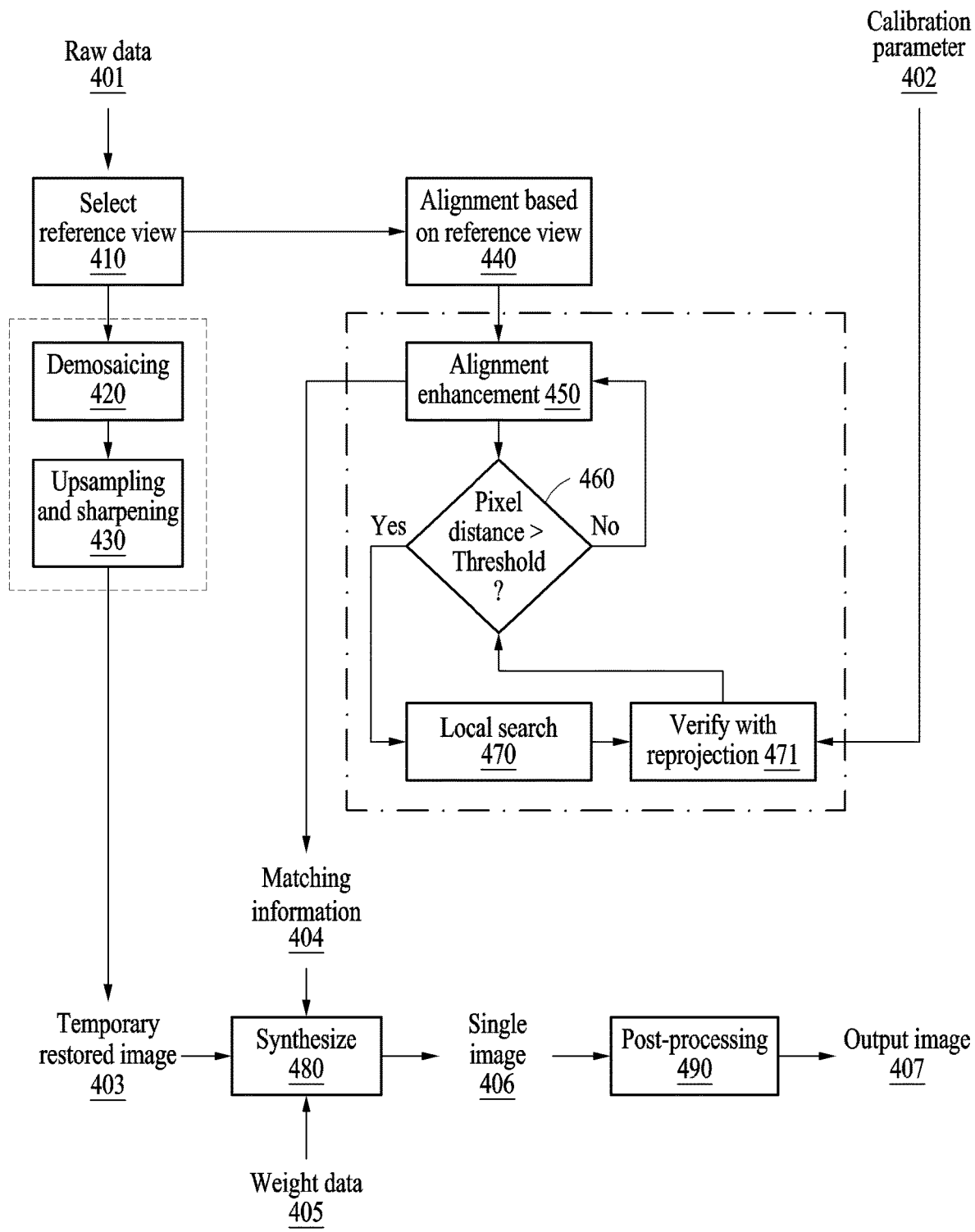
FIG. 4 illustrates an example of an image processing process of multi spread pixel remosaic (SPR), according to one or more embodiments.

FIG. 4 illustrates an example of an image processing process of multi SPR, according to one or more embodiments. Referring to FIG. 4, in operation 410, a reference view may be selected from views of raw data 401. In operation 420, demosaicing based on the raw data 401 may be performed and in operation 430, upsampling and sharpening based on result data of demosaicing may be performed. A temporary restored image 403 may be determined based on upsampling and sharpening. Based on upsampling, each image may be enlarged by 4 times (horizontally 2 times and vertically 2 times). Operations 420 and 430 may be performed on each view.

In operation 440, alignment based on the reference view may be performed. Alignment may be performed based on an optical flow using a neural network model. The optical flow may correspond to a dense optical flow. In operation 450, alignment refinement may be performed. The optical flow may be refined through alignment refinement. In operation 460, a pixel distance of corresponding pixels may be compared to a threshold. Based on the comparison result, a refinement target having a pixel distance greater than the threshold may be selected from the corresponding pixels, in operation 470, a local search for geometric consistency refinement for the refinement target may be performed, and in operation 471, a new pixel of the refinement target may be verified through reprojection. A calibration parameter 402 may be used for reprojection. The geometric consistency refinement may not require iterative image rectification for depth estimation of each array lens camera. Accordingly, explicit geometric warping and correction may be omitted. When pixel distances of all corresponding pixels are less than the threshold, alignment refinement may be finished and matching information 404 may be determined.

In operation 480, a synthesis of the temporary restored image 403 may be performed based on the matching information 404 and the weight data 405. The synthesis may be performed through pixel fusion between each pixel of the reference view of the temporary restored image 403 and corresponding pixels of the other views. As a result of the synthesis, a single image 406 may be generated. In operation 490, post-processing, such as deblurring, may be performed on the single image 406. Deblurring may include optical blur kernel estimation and blur estimation. A neural network model may be used for deblurring. Based on the post-processing, an output image 407 may be determined. The output image 407 may correspond to an RGB or a Bayer.

Figure 5A:
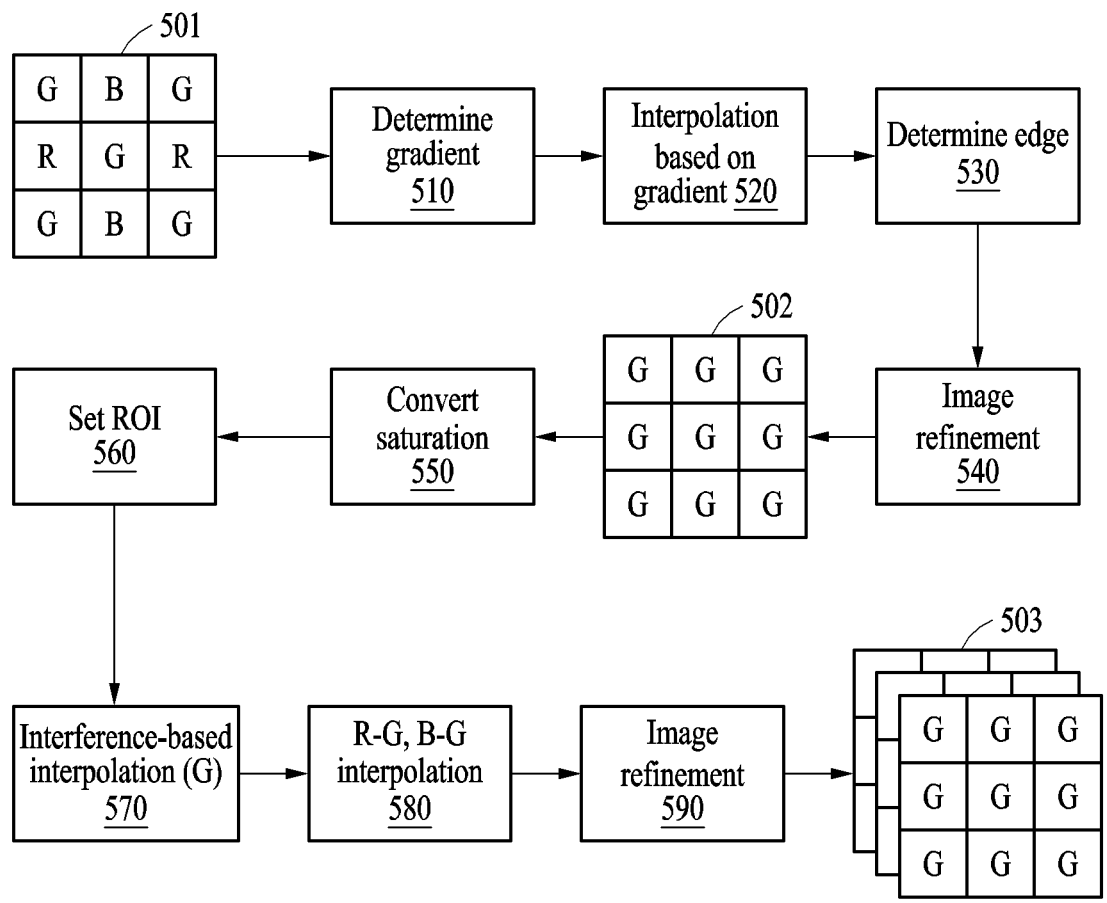
FIG. 5A illustrates an example of a demosaicing operation based on region of interest (ROI) detection, according to one or more embodiments.

FIG. 5A illustrates an example of a demosaicing operation based on ROI detection, according to one or more embodiments. Referring to FIG. 5A, temporary G channel data 502 may be determined based on raw data 501 through operations 510 to 540. In operation 510, a gradient may be determined based on the raw data 501. G channel pixels may be extracted from the raw data 501 and for an empty space between the G channel pixels (in other words, a space where R channel pixels and B channel pixels exist in the raw data 501), a gradient in the vertical direction and a gradient in the horizontal direction may be determined.

In operation 520, gradient-based interpolation may be performed. Interpolation may be performed in a smaller direction of the gradient in the vertical direction and the gradient in the horizontal direction. A gradient value in each direction and an interpolation value of a target pixel may be calculated in various ways. For example, when values of 3*3 grid cells are defined as $C_{11}$ to $C_{33}$, a gradient value V in the vertical direction of $C_{22}$ may be determined through $C_{12}$ to $C_{32}$ and a gradient value H in the horizontal direction of $C_{22}$ may be determined through $C_{21}$ to $C_{23}$. When V is greater than H, it may be determined that $C_{22}=H/2$. When V is less than H, it may be determined that $C_{22}=V/2$. However, various interpolation methods may exist.

In operation 530, edge information may be determined and in operation 540, image refinement may be performed. Operations 530 and 540 may apply to G channel data and the temporary G channel data 502 may be determined through operations 530 and 540. The edge information may include the gradient value and a Laplacian value. The gradient value may be a primary derivative value determined based on a neighboring pixel value of operation 520 and the Laplacian value may be a secondary derivative value determined based on a neighboring pixel value of a neighboring pixel. Since there is no original G channel information in a space two pixels apart from a space between the original G channel pixels (in other words, a space where the R channel pixels and the B channel pixels exist in the raw data 501), R channel information or B channel information may be used as the original G channel information when obtaining the Laplacian value. For example, image refinement may include interpolation in a diagonal direction using edge information in the diagonal direction. In this example, interpolation may represent refinement through interpolation.

When the temporary G channel data 502 is determined, final color data 503 may be determined through operations 550 to 590. The final color data 503 may include final R channel data, final G channel data, and final B channel data.

In operation 550, an ROI may be set. The ROI may be set in the temporary G channel data 502. The ROI may include an interference region where an artifact may highly occur, such as a Moire region. The ROI may be set based on pixels in which a G channel signal is dominant among the R channel signal, G channel signal, and B channel signal. Whether the G channel signal is dominant may be determined based on a difference between a first gradient value of a predetermined pixel location of the temporary G channel data 502 and a second gradient value of a corresponding pixel location of the raw data 501. For example, when the difference is less than a threshold, it may be determined that the G channel signal is dominant at the corresponding pixel location. For example, it may be assumed that the raw data 501 belongs to a first sub image of the sub images. A first gradient value based on an interpolation result using a G channel signal around a first pixel of the first sub image and a second gradient value based on an R channel signal and a B channel signal around the first pixel may be determined. In this example, the interpolation result using a G channel signal may represent the temporary G channel data 502. When a difference between the first gradient value and the second gradient value is less than a threshold, the ROI may be set based on the first pixel.

In operation 560, interpolation based on interference recognition on the temporary G channel data 502 may be performed. Interpolation based on interference recognition may include forward interpolation and cross interpolation. The forward interpolation may be interpolation in the smaller gradient direction, as described in operation 520. The cross interpolation may be interpolation in the vertical direction with respect to the forward interpolation. In other words, the cross interpolation may be interpolation in the greater gradient direction. For example, in the example of the 3*3 grid described above, it may be determined that when V>H, $C_{22}=V/2$ and when V<H, $C_{22}=H/2$. In this example, interpolation may represent refinement through interpolation. Such interpolation may suppress an artifact while maintaining an edge of an ROI, such as a Moire region. A result of operation 560 may correspond to final G channel data.

In operation 570, R-G channel data and B-G channel data may be determined through chroma conversion. According to an example, operation 570 may be performed before operation 560 or operation 550. The R-G channel data may be determined by subtracting each pixel value of final R channel data from each pixel value of R channel data extracted from the raw data 501. The B-G channel data may be determined by subtracting each pixel value of final R channel data from each pixel value of R channel data extracted from the raw data 501.

In operation 580, interpolation may be performed on the R-G channel data and the B-G channel data. Interpolation of operation 580 may correspond to interpolation of operations 510 and 520. For the R-G channel data, interpolation in the smaller gradient direction may be performed on pixels other than R-G pixels and for the B-G channel data, interpolation in the smaller gradient direction may be performed on pixels other than B-G pixels. Then, temporary R channel data and temporary B channel data may be determined by adding final R channel data to the R-G channel data and the B-G channel data. The final R channel data and final B channel data may be determined by applying image refinement of operation 590 to the temporary R channel data and the temporary B channel data. The final color data 503 including the final R channel data, the final G channel data, and the final B channel data may correspond to a demosaicing result.

Figure 5B:
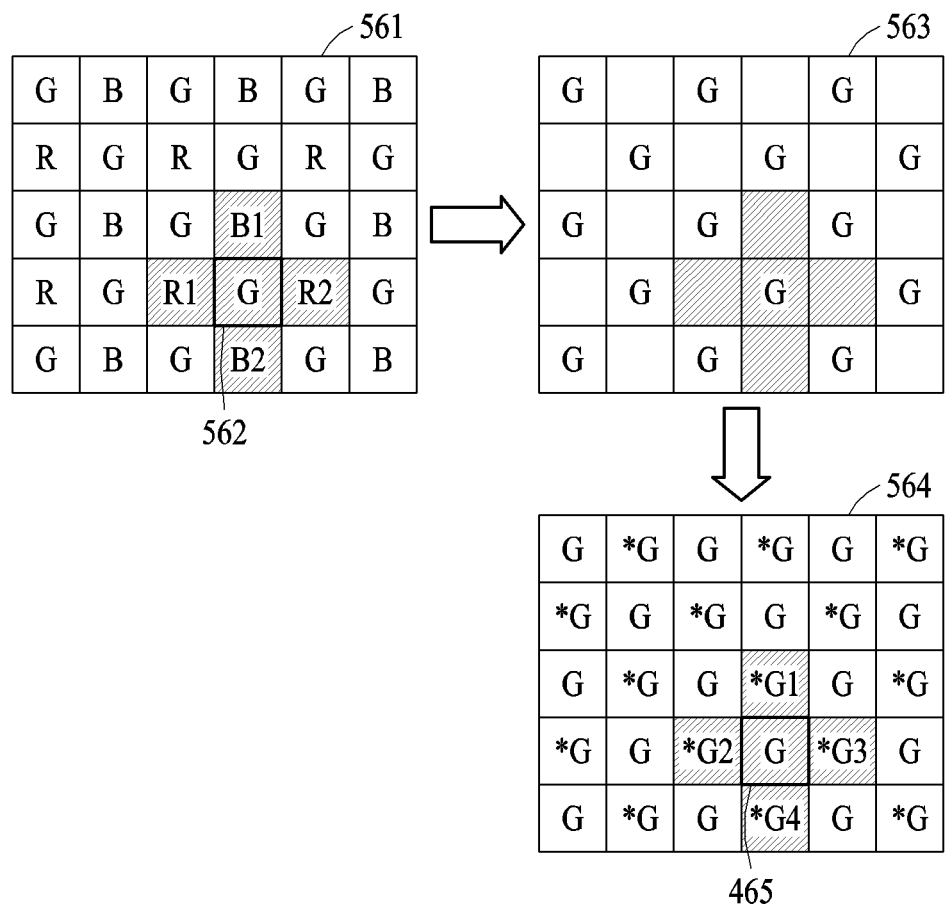
FIG. 5B illustrates an example of an operation of determining a gradient value, according to one or more embodiments.

FIG. 5B illustrates an example of an operation of determining a gradient value, according to one or more embodiments. Referring to FIG. 5B, G channel data 563 may be extracted from raw data 561 including an R channel signal, a G channel signal, and a B channel signal. Temporary G channel data 564 may be determined through gradient-based interpolation (e.g., interpolation of operation 520 of FIG. 5A) on the G channel data 563. In the temporary G channel data 564, a symbol * may be displayed on a pixel generated by interpolation. A first pixel 562 of the raw data 561 may exist at the same location as a second pixel 465 of the temporary G channel data 564. The location may be referred to as a target pixel location.

Whether the target pixel location is included in the ROI may be determined through a comparison between a first gradient value based on interpolation using the temporary G channel data 564 and a second gradient value based on interpolation using the raw data 561. The first gradient value may be determined based on a gradient in the vertical direction using *G1 and *G4 of the temporary G channel data 564 and a gradient in the horizontal direction using *G2 and *G3. For example, a sum of absolute values of two gradient values may be determined to be the first gradient value. The second gradient value may be determined based on a gradient in the vertical direction using B1 and B2 of the raw data 561 and a gradient in the horizontal direction using R1 and R2. For example, a sum of absolute values of two gradient values may be determined to be the second gradient value. When the difference between the first gradient value and the second gradient value is less than a threshold, the ROI may be set such that a target location of a second pixel 465 is included in the ROI. By the same way, it may be determined whether other pixels of the temporary G channel data 564 are included in the ROI.

The example of using the R-G-G-B Bayer pattern as the CFA is described with reference to FIGS. 5A and 5B. According to an example, a different pattern may be used as a CFA. For example, instead of an R-G-G-B arrangement, a different pattern arranged in a first channel signal-a second channel signal-the second channel signal-a third channel signal may be used. In this example, the order of channel signals may correspond to the upper left, upper right, lower left, and lower right of a 2*2 array of the CFA, respectively, For example, an R-C-C-B arrangement, a Cy-Y-Y-M arrangement, and a Cy-Y-Y-R arrangement may be used. In this example, C may denote a clear (C) channel signal, Cy may denote a cyan (Cy) channel signal, Y may denote a yellow (Y) channel signal, and M may denote a magenta (M) channel signal. The second channel signal, which is a dominant color, may be used as G channel data in the Bayer pattern example. For example, when using an R-C-C-B pattern instead of the Bayer pattern, temporary C channel data may be generated in response to a C channel signal and final C channel data may be determined through interference recognition interpolation based on the temporary C channel data. Then, final R channel data and final B channel data may be determined through interpolation on R-C channel data and B-C channel data. Demosaicing in a similar manner may apply to other patterns.

Figure 6:
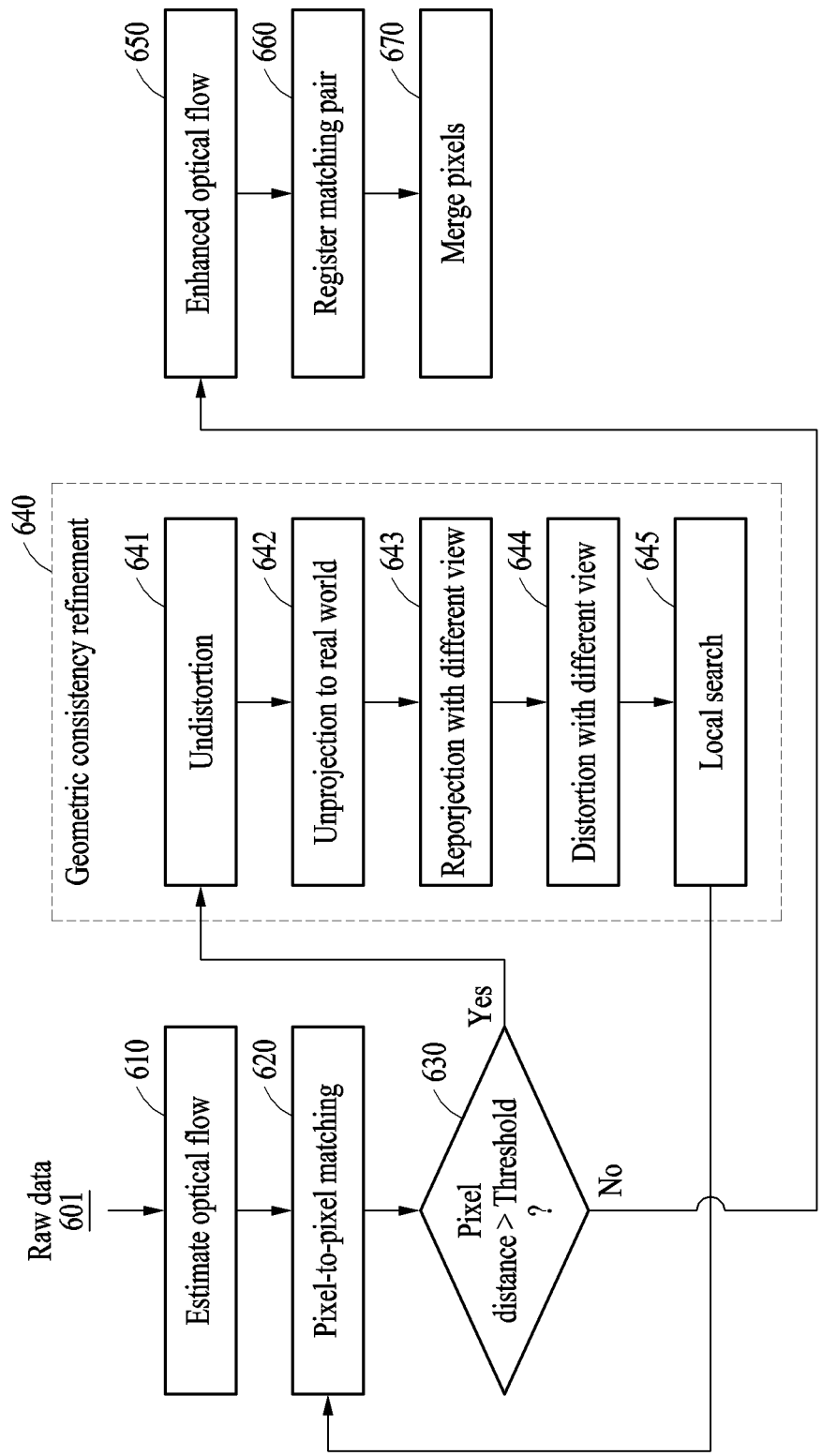
FIG. 6 illustrates an example of a matching information refinement operation using an optical flow, according to one or more embodiments.

FIG. 6 illustrates an example of a matching information refinement operation using an optical flow, according to one or more embodiments. Referring to FIG. 6, in operation 610, an optical flow may be estimated using a neural network model. The optical view may include matching information based on a view difference between sub images of pixels. The optical flow may represent a difference between pixel locations based on a view difference rather than a difference between pixel locations based on a movement over time. In operation 620, pixel-to-pixel matching may be performed based on the matching information. In operation 630, a pixel distance based on the matching result may be compared to a threshold. The pixel distance may represent a distance between corresponding pixels. When a pixel distance of corresponding pixels is greater than the threshold, the corresponding pixels may be extracted as a refinement target and geometric consistency refinement 640 may be applied to the corresponding pixels.

The geometric consistency refinement 640 may include operations 641 to 645. Hereinafter, an example of the geometric consistency refinement 640 on a first refinement target including a first pixel of a first temporary restored image and a second pixel of a second temporary restored image is described.

In operation 641, undistortion may be performed on the first pixel. In operation 642, an undistortion result may be unprojected to the real world. The undistortion and unprojection may be performed based on a first calibration parameter. For example, undistortion may be based on a first intrinsic parameter and unprojection may be based on a first extrinsic parameter (e.g., a rotation parameter and a translation parameter). Through operations 641 and 642, a corresponding pixel of the real world corresponding to the first pixel of the first temporary restored image may be determined.

In operation 643, the corresponding pixel may be reprojected to a different view. In operation 644, distortion may be performed on a reprojection result. The reprojection and distortion may be based on a second calibration parameter. For example, reprojection may be based on a second extrinsic parameter (e.g., a rotation parameter and a translation parameter) and distortion may be based on a second intrinsic parameter. Through operations 643 and 644, a temporary pixel of the second temporary restored image corresponding to a corresponding pixel of the real world may be determined.

In operation 645, a local search may be performed based on a location of the temporary pixel in the second temporary restored image. The matching information may be refined by replacing at least some of target pixels included in the refinement targets based on the local search. Through the local search, for a predetermined range, a search in a predetermined manner may be performed. A new second pixel of the second temporary restored image may be determined through the local search. A matching target of the first pixel of the first refinement target may be updated to the new second pixel.

An array lens camera may be divided into sub camera elements based on involvement of generation of sub images. A calibration parameter may have a different parameter value for a different sub camera element. For example, when a first sub image is generated through a first lens assembly of an array lens assembly and a second sub image is generated through a second lens assembly of the array lens assembly, the first lens assembly and the second lens assembly may be different sub camera elements and different parameter values thereof may be derived. In the example described above, when the first temporary restored image is based on the first sub image, the first calibration parameter, the first intrinsic parameter, and the first extrinsic parameter may be derived for the first lens assembly. When the second temporary restored image is based on the second sub image, the second calibration parameter, the second intrinsic parameter, and the second extrinsic parameter may be derived for the second lens assembly.

When the geometric consistency refinement 640 is finished, operation 620 may be performed again. The pixel matching of operation 620 and the geometric consistency refinement 640 may be repeated until pixel distances of all corresponding pixels decrease to be less than a threshold. When the pixel distances of all corresponding pixels are less than the threshold, a refined optical flow may be determined in operation 650. In this example, refinement may represent the geometric consistency refinement 640. In operation 660, corresponding pixels based on the refined optical flow may be registered and in operation 670, pixel merging may be performed.

Any one of views of sub images may be designated as a reference view. Among temporary restored images, a temporary restored image having the reference view may be referred to as a reference image. The temporary restored images may be merged based on the reference image. Each pixel of an output image may be determined based on a weighted sum of each pixel of the other images of the temporary restored images and corresponding pixels of the remaining images of the temporary restored images. The matching information may be determined by refined matching information. For example, a weighted sum of a first pixel of the reference image and a second pixel of the other image may be determined based on at least one of a first weight based on a difference between an intensity of the first pixel and an intensity of the second pixel, a second weight based on a pixel distance between the first pixel and the second pixel, and a third weight based on whether the first pixel and the second pixel correspond to raw data.

The weighted sum may be performed based on bilateral filtering. Bilateral filtering may include self bilateral filtering and cross bilateral filtering. According to an example, pixel merging may be performed through self bilateral filtering and/or cross bilateral filtering. Based on self bilateral filtering, in one view, a pixel may be merged with surrounding pixels. Self bilateral filtering may be performed through Equations 1 to 4 shown below. Equation 1 shown below may represent a weight based on a pixel intensity difference of the reference view. The pixel intensity may represent a pixel value.

$$w^1_{pq\_22} = \exp\left(-\frac{(G^1_{pq} - G^1_{22})^2}{\sigma^2}\right)$$ [Equation 1]

Figure 9:
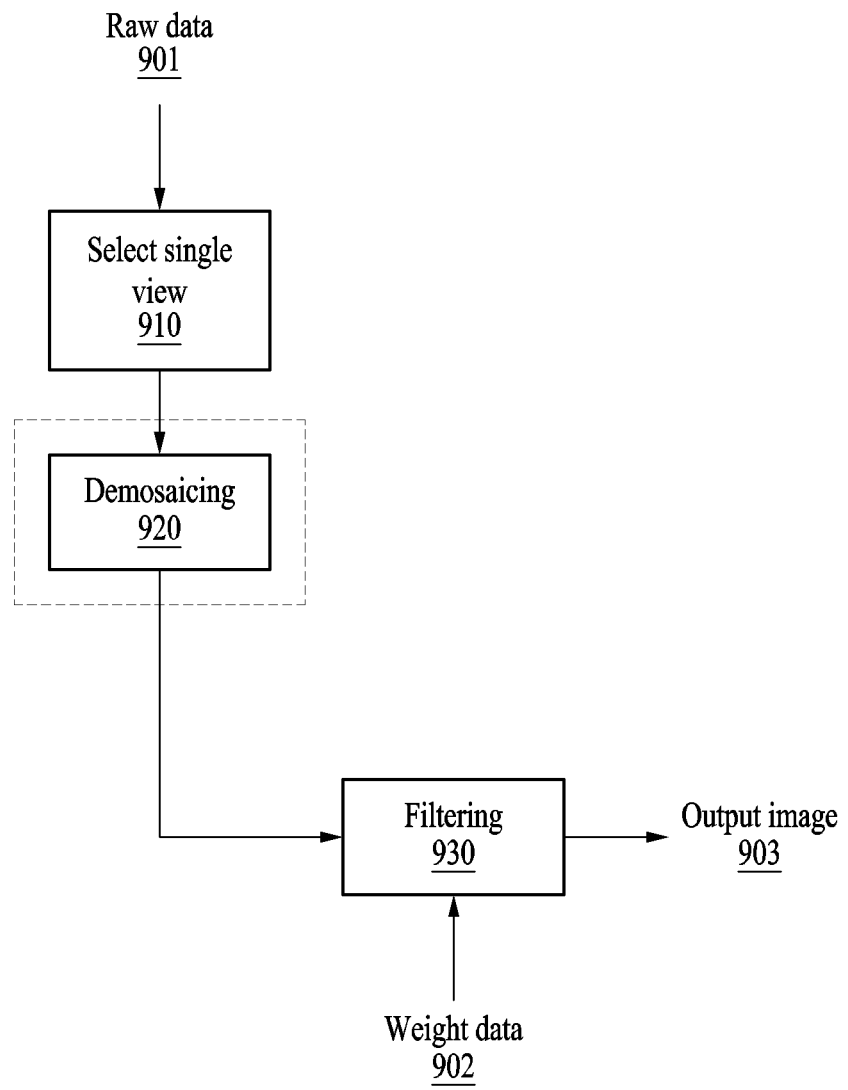
FIG. 9 illustrates an example of an image processing process of single spread pixel binning (SPB), according to one or more embodiments.

In Equation 1, $w^1_{pq\_22}$ may denote a weight based on a pixel intensity difference between $G^1_{pq}$ and $G^1_{22}$, $G^1_{22}$ may denote a pixel intensity of a center pixel, $G^1_{pq}$ may denote a pixel intensity of a neighboring pixel of $G^1_{22}$, and σ may denote a standard deviation. As illustrated in FIG. 9, p and q may have values of 1 to 3, respectively. $G^1_{pq}$ may include $G^1_{22}$. According to Equation 1, as the pixel intensity difference decreases, the weight may increase.

Equation 2 shown below may represent a weight based on a pixel distance of the reference view.

$$w^1_{d\_22} = \exp\left(-\frac{D(G^1_{pq} - G^1_{22})^2}{\sigma^2}\right)$$ [Equation 2]

In Equation 2, $w^1_{d\_22}$ may denote a weight based on a distance between $G^1_{22}$ and $G^1_{pq}$, $D(G^1_{pq}-G^1_{22})$ may denote a distance between $G^1_{pq}$ and $G^1_{22}$, and σ may denote a standard deviation. According to Equation 2, as the distance decreases, the weight may increase.

Equation 3 shown below may represent a fusion weight based on a pixel distance and a difference of pixel intensities of the reference view.

$$w^1_{pq\_d} = w^1_{pq\_22} * w^1_{d\_22}$$ [Equation 3]

In Equation 3, $w^1_{pq\_d}$ may denote a fusion weight. A neighboring pixel may be selected by (p, q).

Equation 4 shown below may represent a pixel merging result of the reference view based on the fusion weight of the reference view.

$$G^1_{22} = \frac{\sum_{p,q} G^1_{p,q} * w^1_{pq\_d}}{\sum_{p,q} w^1_{pq\_d}}$$ [Equation 4]

In Equation 4, $G^1_{22}$ may denote a merged pixel value of the reference view, $G^1_{p,q}$ may denote a pixel of the reference view selected by (p, q), and $w^1_{pq\_d}$ may denote a fusion weight of the selected pixel. p and q may have values of 1 to 3, respectively. Through transformation of Equations 1 to 4, a weight and a pixel merging result of other views may be determined.

Based on cross bilateral filtering, each pixel of a predetermined view and a corresponding pixel of a different view may be merged. The corresponding pixel may be determined through matching information. Referring to FIG. 9, G channel data of a temporary restored image of the reference view may be converted into G channel data of an observation grid through the matching information. For example, the reference view may correspond to a first view of a first sub image and the observation grid may correspond to a second view of a second sub image. A pixel (x, y) of the G channel data of the reference view may be converted into a pixel (x+δx, y+δy) of the G channel data of the observation grid through matching information of (δx, δy).

When δx or δy is not an integer, the pixel (x+δx, y+δy) may not match with predetermined coordinates. According to examples, cross bilateral filtering may be performed while assuming a target grid based on integers δx and δy and a difference between the target grid and the observation grid may be covered through interpolation using a weight. Such cross bilateral filtering may be performed through Equations 5 to 8 shown below. Equation 5 shown below may represent a weight based on a pixel intensity difference of the reference view and a second view of the observation grid.

$$w^{1\_2}_{i\_22} = \exp\left(-\frac{(G^2_{22} - G^1_{22})^2}{\sigma^2}\right)$$ [Equation 5]

In Equation 1, $w^{1-2}_{i\_22}$ may denote a weight based on a pixel intensity difference between $G^2_{22}$ and $G^1_{22}$, $G^1_{22}$ may denote a pixel intensity of a predetermined pixel of the reference view, $G^2_{22}$ may denote a pixel intensity of a corresponding pixel of the second view, and 6 may denote a standard deviation. The corresponding pixel may be determined through matching information. According to Equation 5, as the pixel intensity difference decreases, the weight may increase.

Equation 6 shown below may represent a weight based on a pixel distance of the second view of the observation grid and the reference view.

$$w^{1\_2}_{d\_22} = \exp\left(-\frac{D(G^2_{22} - G^1_{22})^2}{\sigma^2}\right)$$ [Equation 6]

In Equation 6, $w^{1-2}_{d\_22}$ may denote a weight based on a distance between $G^2_{22}$ and $G^1_{22}$, $D(G^2_{22}-G^1_{22})$ may denote a distance between $G^2_{22}$ and $G^1_{22}$, and σ may denote a standard deviation. In cross bilateral filtering, a function D may output a value close to "0" as a distance value decreases and the distance value is close to an integer value obtained by rounding down the distance value. According to Equation 6, as the distance decreases and the distance is close to an integer, the weight may increase.

Equation 7 shown below may represent a fusion weight based on a pixel distance and a pixel intensity difference of the second view of the observation grid and the reference view.

$$w^{1\_2}_{i\_d} = w^{1\_2}_{i\_22} * w^{1\_2}_{d\_22}$$ [Equation 7]

In Equation 7, $w^{1-2}_{i\_d}$ may denote a fusion weight.

Equation 8 shown below may represent a pixel merging result of the reference view based on the fusion weight.

$$G^{1\_final}_{22} = \frac{\sum_i G^1_i \cdot w^{1\_i}_{i\_d}}{\sum_i w^{1\_i}_{i\_d}}$$ [Equation 8]

In Equation 4, $G^{1\_final}_{22}$ may denote a merged pixel value of the reference view, $G^1_i$ may denote a pixel of each view selected by i, and $w^{1-i}_{i\_d}$ may denote a fusion weight of the selected pixel. i may denote an identifier of a view. For example, in the case of four sub images, i may have a value of 1 to 4. A fusion weight associated with a third view and a fourth view may be obtained by transforming Equations 5 to 7.

According to examples, a high weight may be assigned to pixels having the originality. Equations 9 to 11 shown below may represent fusion weights based on a relationship between the reference view and the other views.

$$w_{i\_d}^{1\_2} = w_{i\_22}^{1\_2} * w_{d\_22}^{1\_2} \quad \text{[Equation 9]}$$

$$w_{i\_d}^{1\_3} = w_{i\_22}^{1\_3} * w_{d\_22}^{1\_3} \quad \text{[Equation 10]}$$

$$w_{i\_d}^{1\_4} = w_{i\_22}^{1\_4} * w_{d\_22}^{1\_4} \quad \text{[Equation 11]}$$

Equation 12 shown below may represent a new fusion weight additionally considering originality to the existing fusion weights of Equations 9 to 11.

$$w_{i\_d}^{1\_final} = \Sigma_i w_{i\_d}^{1\_i} * w_o^i \quad \text{[Equation 12]}$$

In Equation 12, $w_{i\_d}^{1\_final}$ may denote a new fusion weight and $w_o^i$ may denote a originality weight. $w_o^i$ may represent a higher weight in case where a target pixel has originality compared to a case where the target pixel does not have originality. When $w_{i\_d}^{1\_final}$ applies to Equation 8 shown above, pixel merging based on the first weight based on the pixel intensity difference, the second weight based on the pixel distance, and the third weight based on the originality may be performed.

Figure 7:
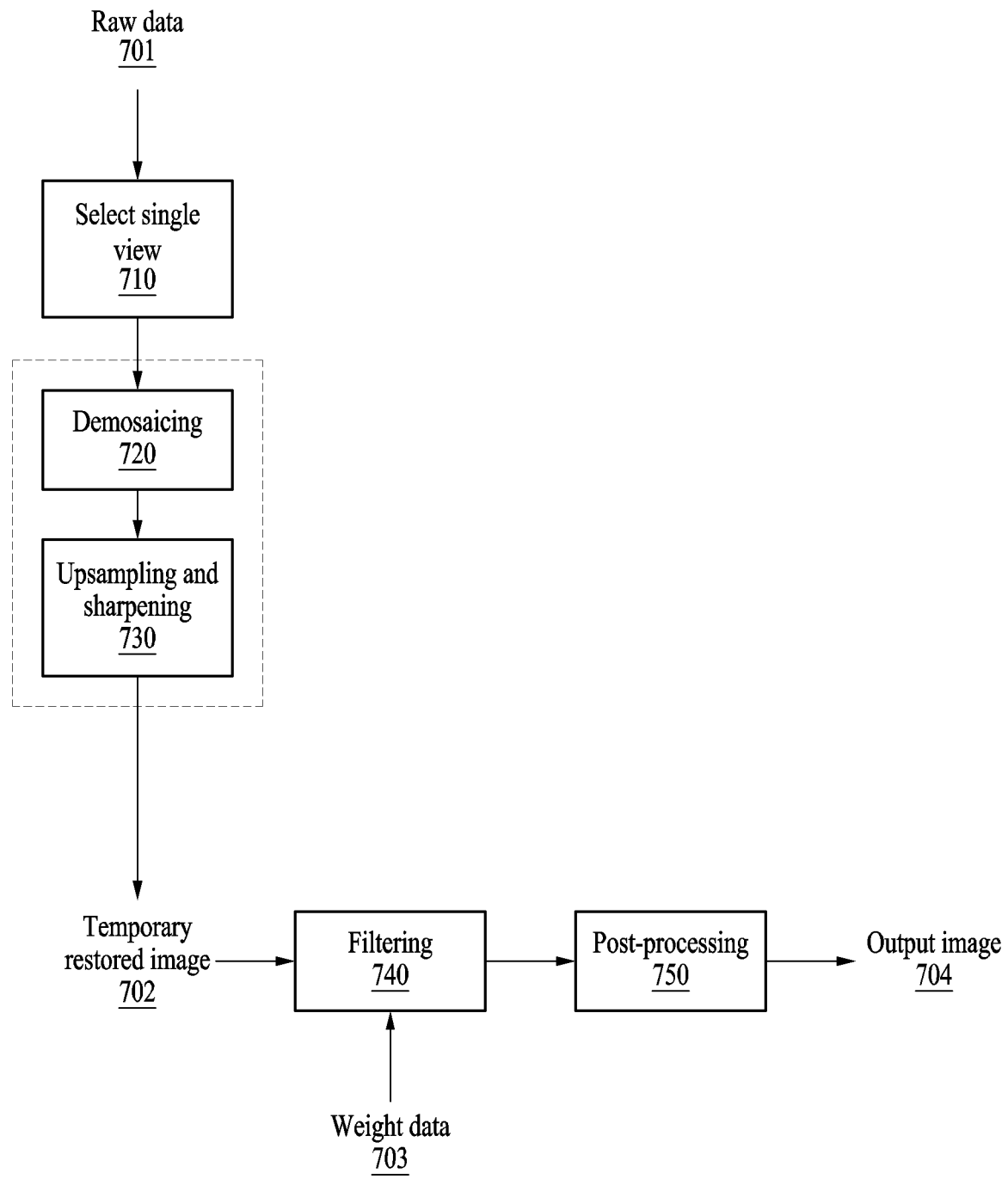
FIG. 7 illustrates an example of an image processing process of single SPR, according to one or more embodiments.

FIG. 7 illustrates an example of an image processing process of single SPR, according to one or more embodiments. Referring to FIG. 7, in operation 710, a reference view may be selected from views of raw data 701. For example, the single view image may be selected based on user selection, random selection, image quality, and the like. For example, a sub image of a view having the smallest defect or distortion may be selected to be the single view image. In operation 720, demosaicing based on the single view image may be performed and in operation 730, upsampling and sharpening based on result data of demosaicing may be performed. A temporary restored image 702 may be determined based on upsampling and sharpening. The size of the temporary restored image 702 may be 4 times (2 times horizontally and 2 times vertically) greater than the single view image.

In operation 740, filtering of the temporary restored image 702 may be performed based on weight data 703. For example, self bilateral filtering may be performed. The weight data 703 may assign a high weight to pixels having originality. In operation 750, post-processing, such as deblurring, may be performed on the filtering result. Based on the post-processing, an output image 704 may be determined. The output image 704 may correspond to an RGB or a Bayer.

Figure 8:
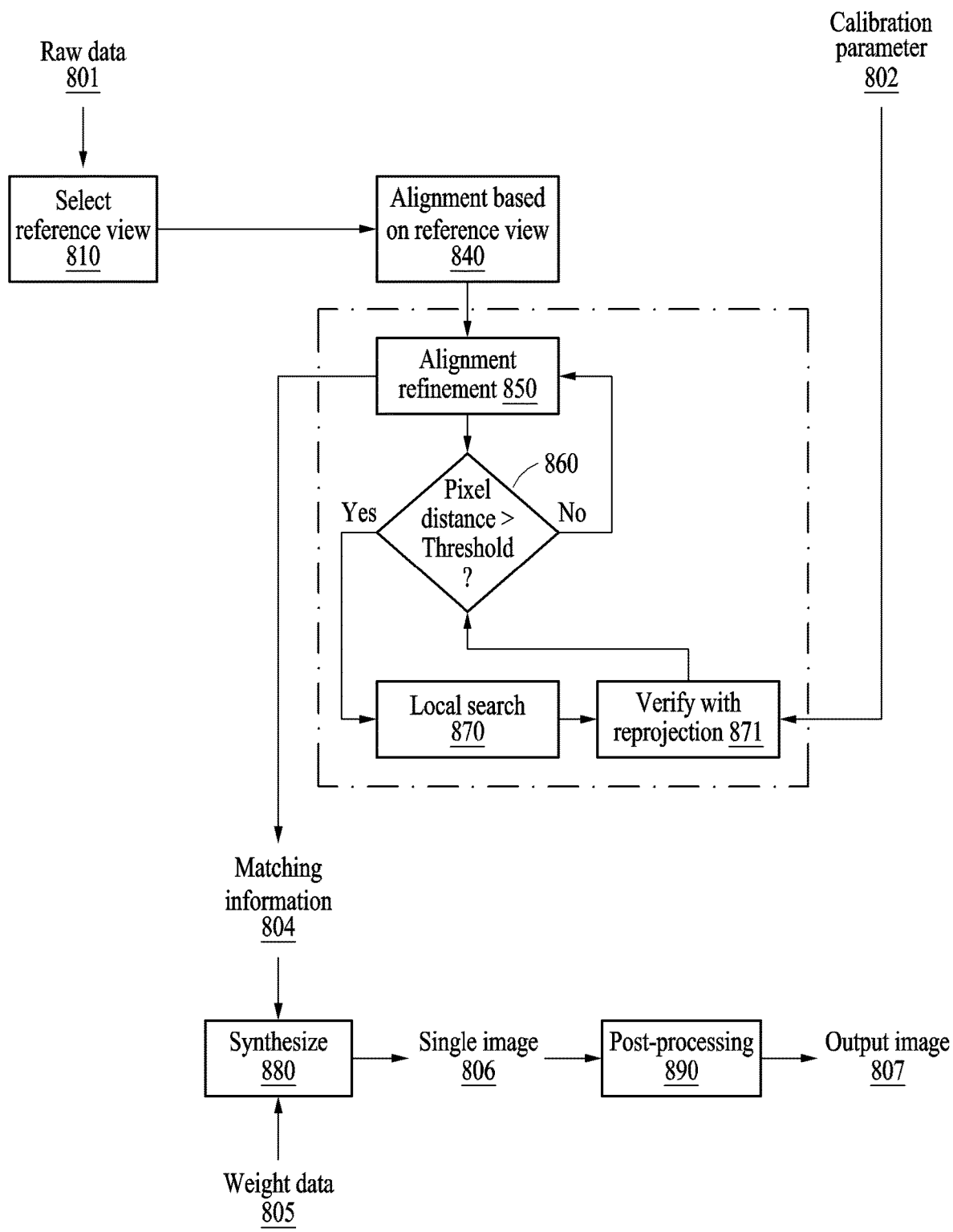
FIG. 8 illustrates an example of an image processing process of multi SPR, according to one or more embodiments.

FIG. 8 illustrates an example of an image processing process of multi SPR, according to one or more embodiments. Referring to FIG. 8, in operation 810, a reference view may be selected from views of raw data 801. In operation 840, alignment based on the reference view may be performed. In operation 850, alignment refinement may be performed. The optical flow may be refined through alignment refinement. In operation 860, a pixel distance of corresponding pixels may be compared to a threshold. Based on the comparison result, a refinement target having a pixel distance greater than the threshold may be selected from the corresponding pixels, in operation 870, a local search for geometric consistency refinement for the refinement target may be performed, and in operation 871, a new pixel of the refinement target may be verified through reprojection. A calibration parameter 802 may be used for reprojection. When pixel distances of all corresponding pixels are less than the threshold, alignment refinement may be finished and matching information 804 may be determined.

In operation 880, a synthesis of sub images of the input array image corresponding to the raw data 801 may be performed based on the matching information 804 and the weight data 805. The synthesis may be performed based on a color version of the sub images. The color version may be derived through a general demosaicing operation. The synthesis may be performed through pixel fusion between each pixel of the reference view of the sub images and corresponding pixels of the other views. As a result of the synthesis, a single image 806 may be generated. In operation 890, post-processing, such as deblurring, may be performed on the single image 806. Based on the post-processing, an output image 807 may be determined. The output image 807 may correspond to an RGB or a Bayer.

FIG. 9 illustrates an example of an image processing process of single spread pixel binning (SPB), according to one or more embodiments. Referring to FIG. 9, in operation 910, a single view may be selected from views of raw data 901. In operation 920, demosaicing may be performed based on the single view image and in operation 930, filtering may be performed on a result of demosaicing based on weight data 902. For example, self bilateral filtering may be performed. The weight data 902 may assign a high weight to pixels having originality. The output image 903 may correspond to an RGB or a Bayer.

Figure 10:
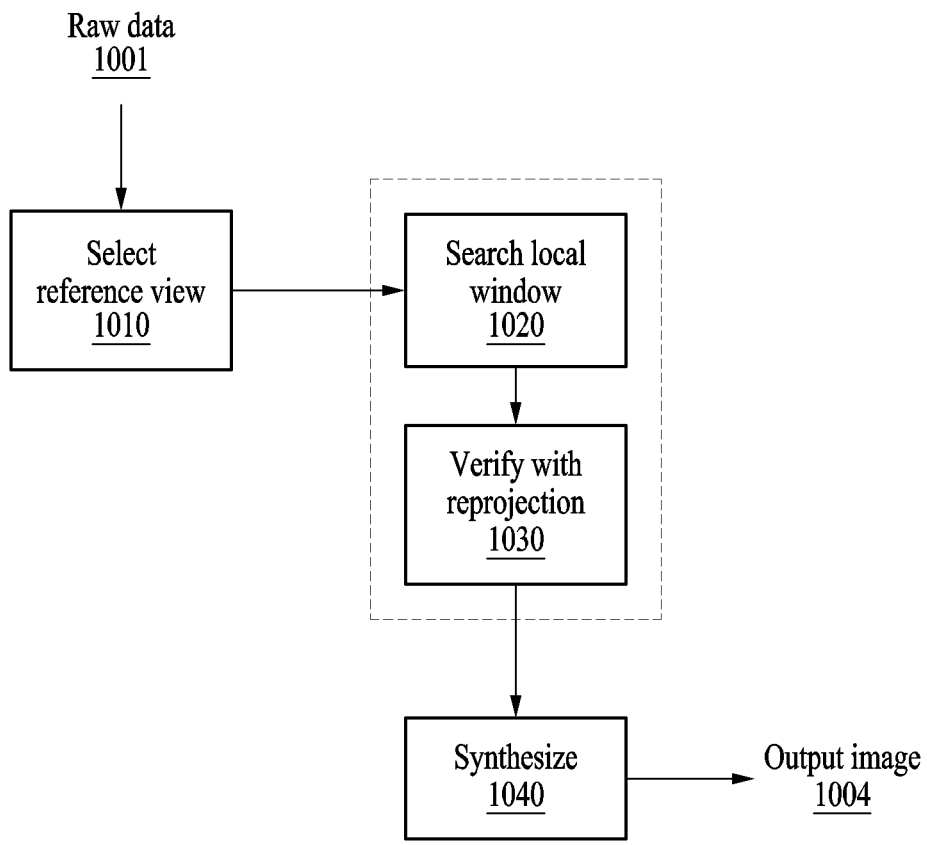
FIG. 10 illustrates an example of an image processing process of hardware (H/W) logic-based SPB, according to one or more embodiments.

FIG. 10 illustrates an example of an image processing process of H/W logic-based SPB, according to one or more embodiments. Referring to FIG. 10, in operation 1010, a reference view may be selected from views of raw data 1001. Based on focal plane information of an input array image and a calibration parameter of an imaging device, initial corresponding pixels between sub images respectively corresponding to different views in the input array image corresponding to the raw data 1001 may be determined. The calibration parameter may include an extrinsic parameter and an intrinsic parameter of the imaging device. The extrinsic parameter may include information of a relationship between individual lens assemblies. Through operations 1020 and 1030, the initial corresponding pixels may be verified. In operation 1020, a local window search may be performed and in operation 1030, verification through reprojection may be performed. Through operations 1020 and 1030, final corresponding pixels may be determined. The output image 1004 may be determined through synthesis of the final corresponding pixels in operation 1040. The synthesis may include a weighted average of the final corresponding pixels. The output image 1004 may correspond to a binning result.

Figure 11A:
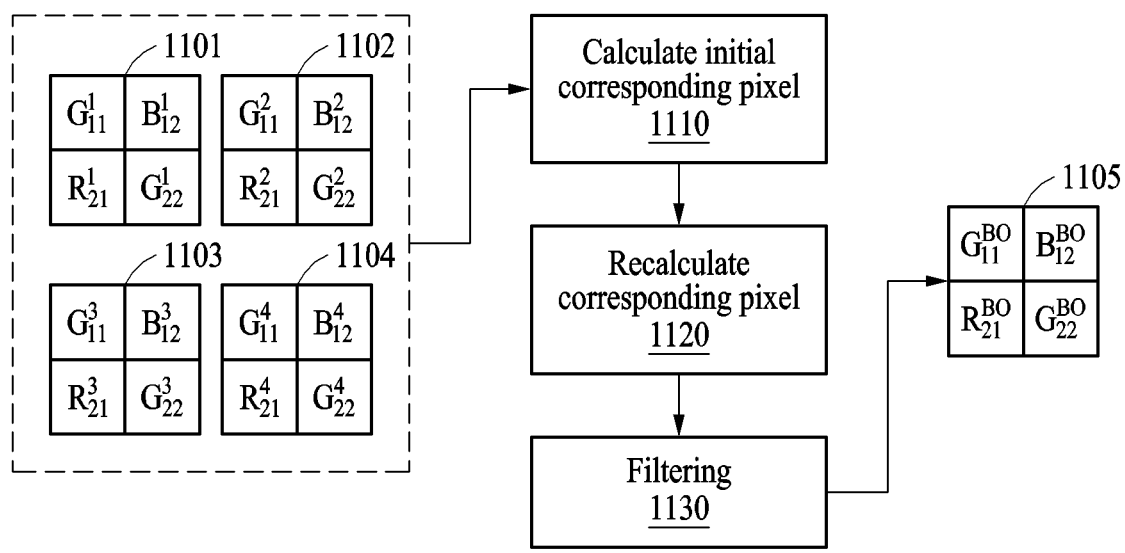
FIG. 11A illustrates an example of a binning operation of H/W logic-based SPB, according to one or more embodiments.

FIG. 11A illustrates an example of a binning operation of H/W logic-based SPB, according to one or more embodiments. Referring to FIG. 11A, a reference view may be selected from sub images 1101 to 1104. For example, a first view of the first sub image 1101 may be selected to be the reference view. In operation 1110, initial corresponding pixels between sub images 1101 to 1104 may be calculated based on focal plane information of an input array image corresponding to the sub images 1101 to 1104 and a calibration parameter of an imaging device that generated the input array image.

In operation 1120, recalculation of the corresponding pixels may be performed. Among corresponding pixels, a pixel having an intensity difference greater than or equal to a threshold may be extracted as a refinement target. A new corresponding pixel for the refinement target may be determined using the calibration parameter. For example, when a first corresponding pair includes a first pixel of the first sub image 1101 and a second pixel of the second sub image 1102 and an intensity difference between the first pixel and the second pixel is greater than or equal to a threshold, the first corresponding pair may be extracted as the refinement target. A third pixel in the second sub image 1102 may be selected by performing reprojection on the first pixel by using the calibration parameter. In this case, geometric consistency refinement 640 of FIG. 6 may be applied to reprojection. The third pixel may be determined to be a new corresponding pixel of the first pixel. To reduce computations, operation 1120 may be performed on some channels (e.g., a Gr channel), and operation 1130 may be performed on all channels (e.g., a Gr channel, an R channel, a B channel, and a Gb channel).

Based on final corresponding pairs including a corresponding pair of the first pixel and the third pixel, filtering of operation 1130 may be performed. The filtering may include a weighted average. For example, through a weighted average of the corresponding pixels (e.g., pixels $G_{11}^{1}$, $G_{11}^{2}$, $G_{11}^{3}$, and $G_{11}^{4}$), each pixel (e.g., a pixel $G_{11}^{BO}$) of a binning result 1105 may be determined. An intensity difference and/or a distance difference between the corresponding pixels may be used as a weight. A H/W logic that performs operations 1110, 1120, and 1130 may be implemented. Through the H/W logic, H/W SPB (e.g., H/W multi SPB) may be performed.

Figure 11B:
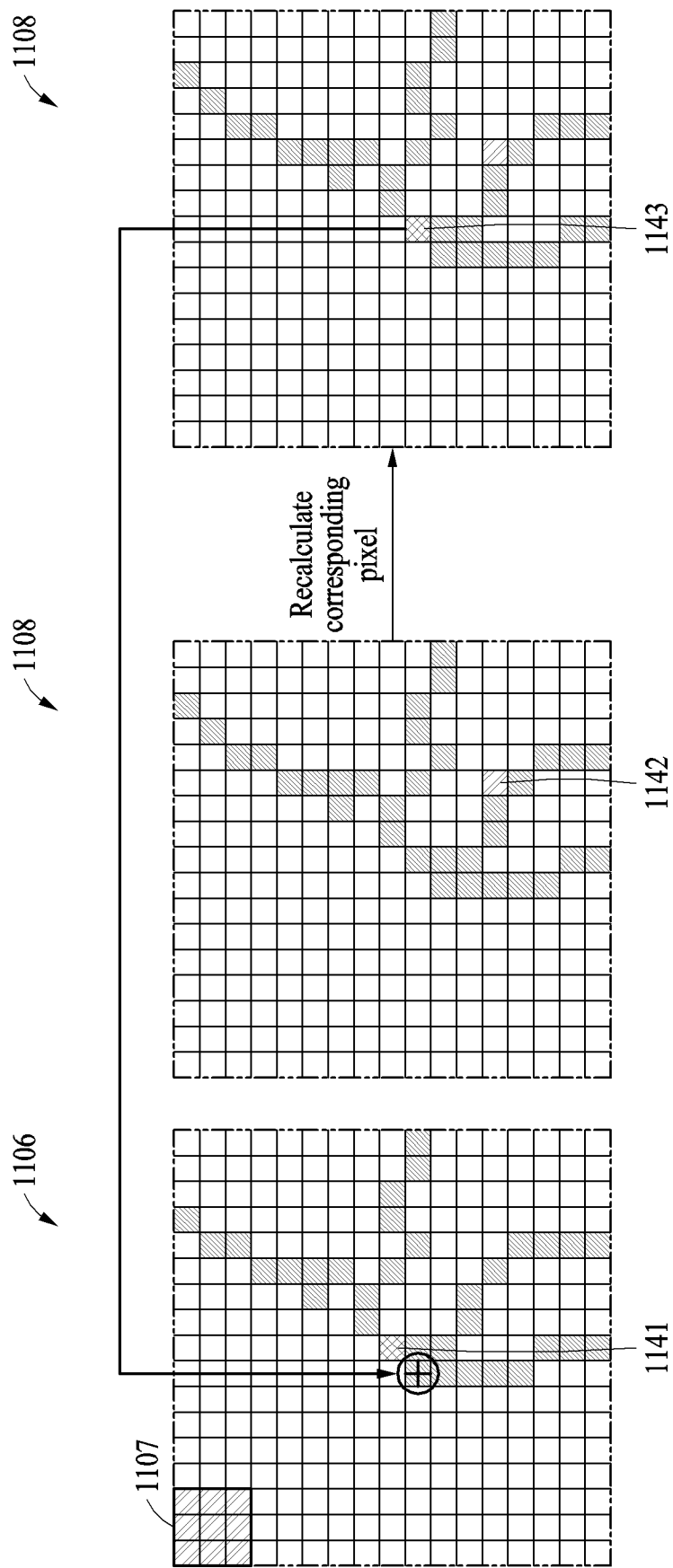
FIG. 11B illustrates an example of a searching operation of corresponding pixels, according to one or more embodiments.

FIG. 11B illustrates an example of a searching operation of corresponding pixels, according to one or more embodiments. Referring to FIG. 11B, a first pixel 1141 of a first sub image 1106 of a first view and a second pixel 1142 of a second sub image 1108 of a second view may be determined to be an initial corresponding pixel. Due to an intensity difference between the first pixel 1141 and the second pixel 1142, a corresponding pair of the first pixel 1141 and the second pixel 1142 may be selected to be a refinement target. A third pixel 1143 may be selected to be a new corresponding pixel through recalculation for the refinement target. Through a local search using a local window 1107, the third pixel 1143 may be found.

According to an example, binning of H/W logic-based SPB may be performed through Equation 13 shown below.

$$Gr_{spb} = \frac{\sum_{i=0}^{3} Gr_i \cdot w_i}{\sum_{i=0}^{3} w_i} \quad \text{[Equation 13]}$$

In Equation 13, $Gr_{spb}$ may denote a pixel of a binning result, $Gr_i$ may denote a pixel of a sub image that is a binning target, and $w_i$ may denote a weight. In an example, the weight may be expressed as shown in Equation 14 below.

$$w_i = \exp\left(-\frac{(Gr_i - Gr_0)^2}{\sigma^2}\right) \quad \text{[Equation 14]}$$

In Equation 14, $Gr_0$ may denote a pixel of a reference view and $Gr_i$ may denote a pixel of the remaining view. Although Equation 14 shows an example of a weight based on a pixel intensity, a different weight, such as pixel distance, may be used.

Figure 12:
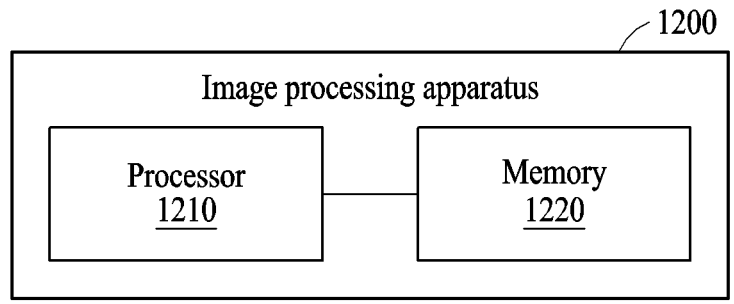
FIG. 12 illustrates an example of a configuration of an image processing apparatus, according to one or more embodiments.

FIG. 12 illustrates an example of a configuration of an image processing apparatus, according to one or more embodiments. Referring to FIG. 12, an image processing apparatus 1200 may include a processor 1210 and a memory 1220. The memory 1220 is connected to the processor 1210 and may store instructions executable by the processor 1210, data to be operated by the processor 1210, or data processed by the processor 1210. The memory 1220 may include a non-transitory computer-readable medium (for example, a high-speed random access memory) and/or a non-volatile computer-readable medium (for example, at least one disk storage device, a flash memory device, or another non-volatile solid-state memory device).

The processor 1210 may execute instructions to perform the operations described herein with reference to FIGS. 1 to 11, FIG. 13, and FIG. 14. For example, based on an imaging device configured to generate an input array image of a multi-view through an array lens, the processor 1210 may determine a first setting parameter based on whether to use a multi-view or a single view selected from the multi-view, may determine a second setting parameter based on whether a priority is assigned to sensitivity enhancement based on pixel binning or to resolution enhancement based on pixel interpolation, may determine an image processing mode based on the first setting parameter and the second setting parameter, and may generate an output image by performing image processing on the input array image based on a processing procedure based on the image processing mode. In addition, the description provided with reference to FIGS. 1 to 11, FIG. 13, and FIG. 14 may apply to the image processing apparatus 1200.

Figure 13:
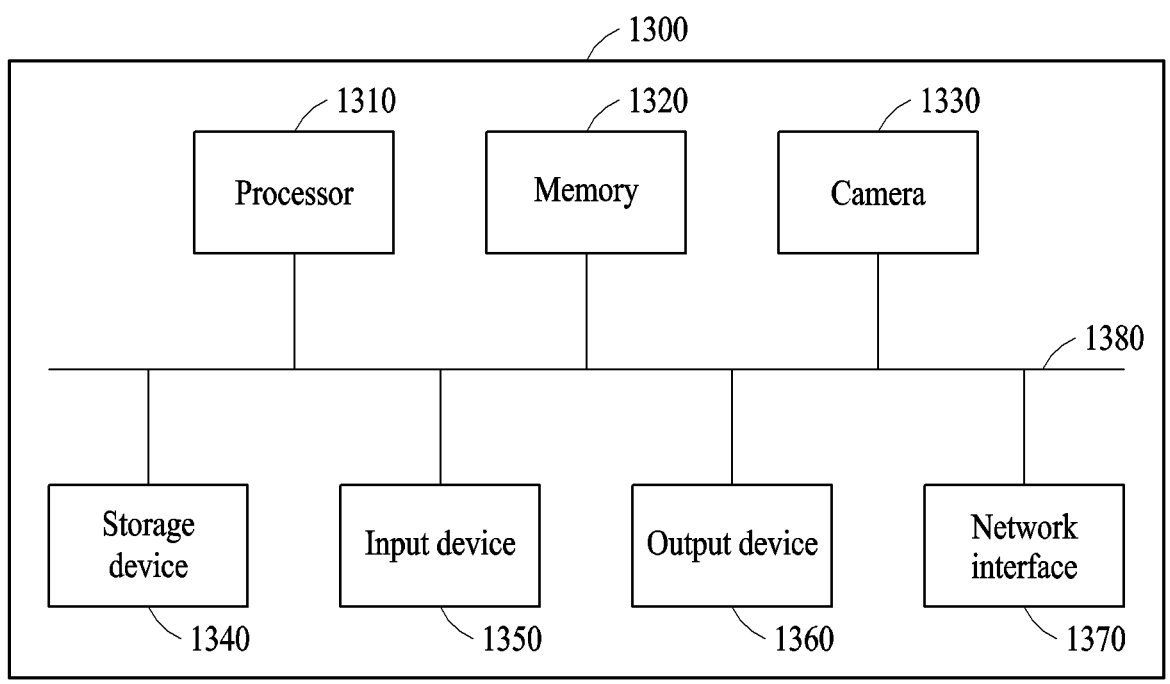
FIG. 13 illustrates an example of a configuration of an electronic device, according to one or more embodiments.

FIG. 13 illustrates an example of a configuration of an electronic device, according to one or more embodiments. Referring to FIG. 13, an electronic device 1300 may include a processor 1310, a memory 1320, a camera 1330, a storage device 1340, an input device 1350, an output device 1360, and a network interface 1370 that may communicate with each other via a communication bus 1380. For example, the electronic apparatus 1300 may be implemented as at least a portion of, for example, a mobile device such as a mobile phone, a smartphone, a personal digital assistant (PDA), a netbook, a tablet computer, a laptop computer, and the like, a wearable device such as a smart watch, a smart band, smart glasses, and the like, a home appliance such as a television (TV), a smart TV, a refrigerator, and the like, a security device such as a door lock and the like, and a vehicle such as an autonomous vehicle, a smart vehicle, and the like. The electronic device 1300 may structurally and/or functionally include at least a portion of the imaging device 110 of FIGS. 1A and 1B, the image processing apparatus 120 of FIG. 1A, and the image processing apparatus 1200 of FIG. 12.

The processor 1310 executes functions and instructions for execution in the electronic device 1300. For example, the processor 1310 may process instructions stored in the memory 1320 or the storage device 1340. The processor 1310 may perform operations of FIGS. 1 to 12 and FIG. 14. The memory 1320 may include a computer-readable storage medium or a computer-readable storage device. The memory 1320 may store instructions to be executed by the processor 1310 and may store related information while software and/or an application is executed by the electronic device 1300.

The camera 1330 may capture a photo and/or a video. The camera 1330 may include an array lens assembly. For example, the camera 1330 may include the imaging device 110 of FIGS. 1A and 1B. The storage device 1340 may include a computer-readable storage medium or a computer-readable storage device. The storage device 1340 may store more information than the memory 1320 for a long time. For example, the storage device 1340 may include a magnetic hard disk, an optical disc, a flash memory, a floppy disk, or other types of non-volatile memory known in the art.

The input device 1350 may receive an input from the user in traditional input manners through a keyboard and a mouse and in new input manners such as a touch input, a voice input, and an image input. For example, the input device 1350 may include a keyboard, a mouse, a touch screen, a microphone, or any other device that detects the input from the user and transmits the detected input to the electronic device 1300. The output device 1360 may provide an output of the electronic device 1300 to the user through a visual, auditory, or haptic channel. The output device 1360 may include, for example, a display, a touch screen, a speaker, a vibration generator, or any other device that provides the output to the user. The network interface 1370 may communicate with an external device through a wired or wireless network.

Figure 14:
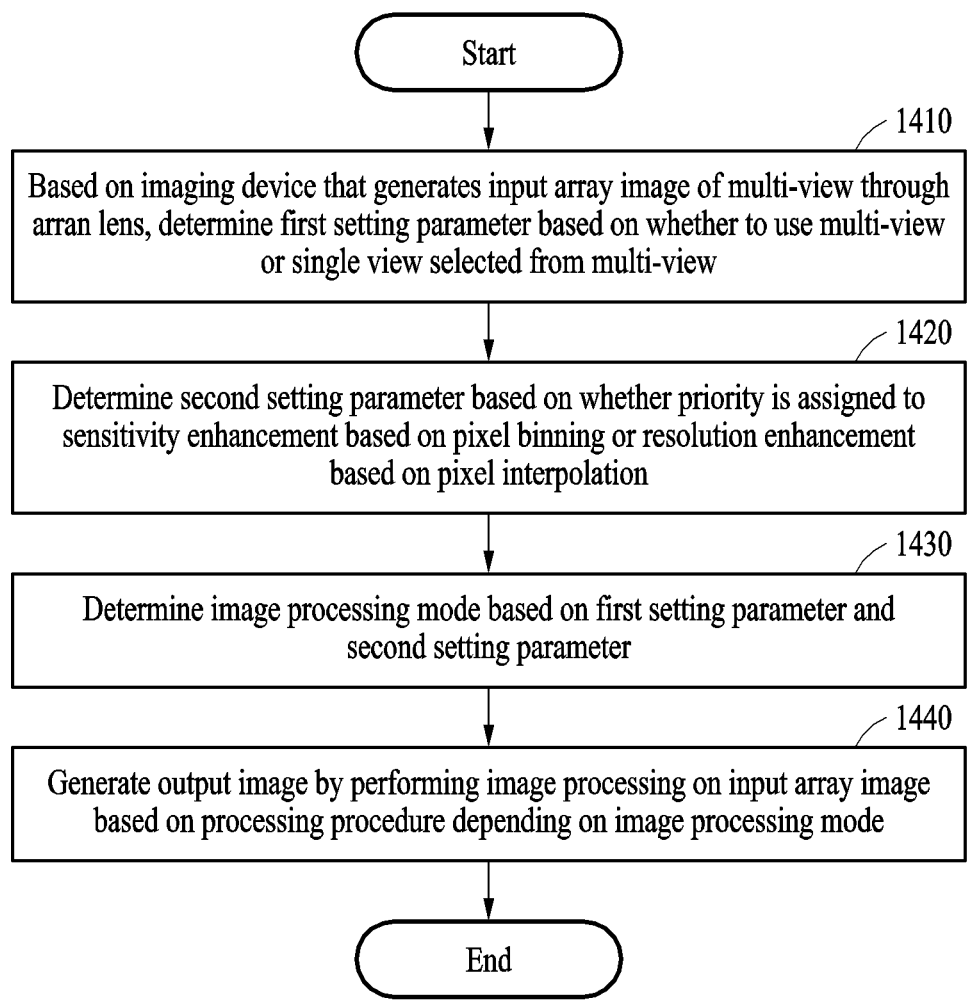
FIG. 14 illustrates an example of an image processing method according to one or more embodiments.

FIG. 14 illustrates an example of an image processing method according to one or more embodiments. Referring to FIG. 14, in operation 1410, an image processing apparatus may determine, based on an imaging device configured to generate an input array image of a multi-view through an array lens, a first setting parameter based on whether to use the multi-view or a single view selected from the multi-view, in operation 1420, may determine a second setting parameter based on whether a priority is assigned to sensitivity enhancement based on pixel binning or to resolution enhancement based on pixel interpolation, in operation 1430, may determine an image processing mode based on the first setting parameter and the second setting parameter, and in operation 1440, may generate an output image by performing image processing on the input array image based on a processing procedure based on the image processing mode.

The image processing mode may include at least one of a first mode that is used when the multi-view is used and the priority is set to the resolution enhancement, a second mode that is used when the multi-view is used and the priority is set to the sensitivity enhancement, a fourth mode that is used when the single view is used and the priority is set to the resolution enhancement, and a fifth mode that is used when the single view is used and the priority is set to the sensitivity enhancement.

A processing procedure of the first mode may include sub stages, and each processing procedure of the second mode, the fourth mode, and the fifth mode may include some of the sub stages. The sub stages may include a first sub stage for performing demosaicing on raw data, a second sub stage for performing upsampling for resolution enhancement, a third sub stage for generating matching information of the multi-view, and a fourth sub stage for generating a synthesized image using the matching information. In the processing procedure of the second mode, the first sub stage and the second sub stage may be excluded, in the processing procedure of the fourth mode, the third sub stage and the fourth sub stage may be excluded, and in the processing procedure of the fifth mode, the second sub stage, the third sub stage, and the fourth sub stage may be excluded.

The image processing apparatus may further perform determining a third setting parameter based on whether H/W logic-based binning processing is used. Operation 1430 may include determining the image processing mode based on the first setting parameter, the second setting parameter, and the third setting parameter.

The image processing mode may include at least one of a first mode that is used when the multi-view is used, the H/W logic-based binning processing is not used, and the priority is assigned to resolution enhancement, a second mode that is used when the multi-view is used, the H/W logic-based binning processing is not used, and the priority is assigned to sensitivity enhancement, a third mode that is used when the multi-view is used and the H/W logic-based binning processing is used, a fourth mode that is used when the single view is used, the H/W logic-based binning processing is not used, and the priority is assigned to resolution enhancement, a fifth mode that is used when the single view is used, the H/W logic-based binning processing is not used, and the priority is assigned to sensitivity enhancement, and a sixth mode that is used when the single view is used and the H/W logic-based binning processing is used.

In at least some of a low-illuminance environment or a video capturing mode, the third setting parameter may be determined to use the H/W logic-based binning processing. The H/W logic-based binning processing may include determining initial corresponding pixels between sub images respectively corresponding to different views of the input array image, extracting a refinement target from the initial corresponding pixels based on an intensity difference between the initial corresponding pixels, determining a new corresponding pixel for a refinement target by using a calibration parameter, and performing binning on final corresponding pixels through a weighted average of the final corresponding pixels based on the new corresponding pixel.

The first setting parameter may be determined to use the single view in response to a demand for low power.

In addition, descriptions provided with reference to FIGS. 1 to 13 may apply to the image processing method of FIG. 14.

The examples described herein may be implemented using H/W components, software components and/or combinations thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or pseudo equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. An image processing method comprising:
based on an imaging device generating an input array image of a multi-view through an array lens, determining a first setting parameter indicating whether to use the multi-view or a single view selected from the multi-view;
determining a second setting parameter indicating whether a priority is assigned to sensitivity enhancement based on pixel binning or to resolution enhancement based on pixel interpolation;
determining an image processing mode based on the first setting parameter and the second setting parameter; and
generating an output image by performing image processing on the input array image based on a processing procedure that is based on the determined image processing mode.

2. The image processing method of claim 1, wherein the determined image processing mode comprises:
a first mode that is determined when the first setting parameter indicates to use the multi-view and the second setting parameter indicates the priority is assigned to the resolution enhancement,
a second mode that is determined when the first setting parameter indicates to use the multi-view and the second setting parameter indicates the priority is assigned to the sensitivity enhancement,
a fourth mode that is determined when the first setting parameter indicates to use the single view and the second setting parameter indicates the priority is assigned to the resolution enhancement, or
a fifth mode that is determined when the first setting parameter indicates to use the single view and the second setting parameter indicates the priority is assigned to the sensitivity enhancement.

3. The image processing method of claim 2,
wherein the processing procedure that is based on the first mode comprises sub stages, and
wherein the processing procedure that is based on the second mode, the fourth mode, or the fifth mode comprises only some of the sub stages.

4. The image processing method of claim 3, wherein the sub stages comprise:
a first sub stage for performing demosaicing on raw data,
a second sub stage for performing upsampling for resolution enhancement,
a third sub stage for generating matching information of the multi-view, and
a fourth sub stage for generating a synthesized image using the matching information.

5. The image processing method of claim 4,
wherein the processing procedure that is based on the second mode does not include the first sub stage and the second sub stage,
wherein the processing procedure that is based on the fourth mode does not include the third sub stage and the fourth sub stage, and
wherein the processing procedure that is based on the fifth mode does not include the second sub stage, the third sub stage, and the fourth sub stage.

6. The image processing method of claim 1, further comprising:
determining a third setting parameter indicating whether to use hardware logic-based binning processing,
wherein the determining the image processing mode is further based on the third setting parameter.

7. The image processing method of claim 6, wherein the determined image processing mode comprises:
a first mode that is determined when the first setting parameter indicates to use the multi-view, the third setting parameter indicates to not use the hardware logic-based binning processing, and the second setting parameter indicates the priority is assigned to the resolution enhancement,
a second mode that is determined when the first setting parameter indicates to use the multi-view, the third setting parameter indicates to not use the hardware logic-based binning processing, and the second setting parameter indicates the priority is assigned to the sensitivity enhancement,
a third mode that is determined when the first setting parameter indicates to use the multi-view and the third setting parameter indicates to use the hardware logic-based binning processing,
a fourth mode that is determined when the first setting parameter indicates to use the single view, the third setting parameter indicates to not use the hardware logic-based binning processing, and the second setting parameter indicates the priority is assigned to the resolution enhancement,
a fifth mode that is determined when the first setting parameter indicates to use the single view, the third setting parameter indicates to not use the hardware logic-based binning processing, and the second setting parameter indicates the priority is assigned to the sensitivity enhancement, and a sixth mode that is determined when the first setting parameter indicates to use the single view and the third setting parameter indicates to use the hardware logic-based binning processing.

8. The image processing method of claim 6, wherein the third setting parameter indicates to use the hardware logic-based binning processing in at least one of a low-illuminance environment or a video capturing mode.

9. The image processing method of claim 6, wherein the hardware logic-based binning processing comprises:
   determining initial corresponding pixels between sub images that respectively correspond to different views of the input array image,
   extracting a refinement target from the initial corresponding pixels based on an intensity difference between the initial corresponding pixels,
   determining a new corresponding pixel for the refinement target by using a calibration parameter, and
   performing binning on final corresponding pixels through a weighted average of the final corresponding pixels that are based on the new corresponding pixel.

10. The image processing method of claim 1, wherein the first setting parameter indicates to use the single view in response to a demand for low power.

11. A non-transitory computer-readable storage medium storing instructions that, when executed by a processor, cause the processor to perform an image processing method comprising:
   Based on an imaging device generating an input array image of a multi-view through an array lens, determining a first setting parameter indicating whether to use the multi-view or a single view selected from the multi-view;
   determining a second setting parameter indicating whether a priority is assigned to sensitivity enhancement based on pixel binning or to resolution enhancement based on pixel interpolation;
   determining an image processing mode based on the first setting parameter and the second setting parameter; and
   generating an output image by performing image processing on the input array image based on a processing procedure that is based on the determined image processing mode.

12. An image processing apparatus comprising:
   a processor; and
   a memory configured to store instructions executable by the processor,
   wherein, in response to the instructions being executed by the processor, the processor is configured to:
      based on an imaging device generating an input array image of a multi-view through an array lens, determine a first setting parameter indicating whether to use the multi-view or a single view selected from the multi-view,
      determine a second setting parameter indicating whether a priority is assigned to sensitivity enhancement based on pixel binning or to resolution enhancement based on pixel interpolation,
      determine an image processing mode based on the first setting parameter and the second setting parameter, and
      generate an output image by performing image processing on the input array image based on a processing procedure that is based on the determined image processing mode.

13. The image processing apparatus of claim 12, wherein the determined image processing mode comprises:
   a first mode that is determined when the first setting parameter indicates to use the multi-view and the second setting parameter indicates the priority is assigned to the resolution enhancement,
   a second mode that is determined when the first setting parameter indicates to use the multi-view and the second setting parameter indicates the priority is assigned to the sensitivity enhancement,
   a fourth mode that is determined when the first setting parameter indicates to use the single view and the second setting parameter indicates the priority is assigned to the resolution enhancement, or
   a fifth mode that is determined when the first setting parameter indicates to use the single view and the second setting parameter indicates the priority is assigned to the sensitivity enhancement.

14. The image processing apparatus of claim 13,
   wherein the processing procedure that is based on the first mode comprises sub stages, and
   wherein the processing procedure that is based on the second mode, the fourth mode, or the fifth mode comprises only some of the sub stages.

15. The image processing apparatus of claim 12, wherein the processor is further configured to:
   determine a third setting parameter indicating whether to use hardware logic-based binning processing,
   wherein the processor being configured to determine the image processing mode is further based on the third setting parameter.

16. The image processing apparatus of claim 15, wherein the determined image processing mode comprises:
   a first mode that is determined when the first setting parameter indicates to use the multi-view, the third setting parameter indicates to not use the hardware logic-based binning processing, and the second setting parameter indicates the priority is assigned to the resolution enhancement,
   a second mode that is determined when the first setting parameter indicates to use the multi-view, the third setting parameter indicates to not use the hardware logic-based binning processing, and the second setting parameter indicates the priority is assigned to the sensitivity enhancement,
   a third mode that is determined when the first setting parameter indicates to use the multi-view and the third setting parameter indicates to use the hardware logic-based binning processing,
   a fourth mode that is determined when the first setting parameter indicates to use the single view, the third setting parameter indicates to not use the hardware logic-based binning processing, and the second setting parameter indicates the priority is assigned to the resolution enhancement,
   a fifth mode that is determined when the first setting parameter indicates to use the single view, the third setting parameter indicates to not use the hardware logic-based binning processing, and the second setting parameter indicates the priority is assigned to the sensitivity enhancement, and
   a sixth mode that is determined when the first setting parameter indicates to use the single view and the third setting parameter indicates to use the hardware logic-based binning processing.

17. The image processing apparatus of claim 15, wherein the third setting parameter indicates to use the hardware logic-based binning processing in at least one of a low-illuminance environment or a video capturing mode.

18. The image processing apparatus of claim 15, wherein the hardware logic-based binning processing comprises the processor being configured to:
- determine initial corresponding pixels between sub images respectively that correspond to different views of the input array image,
- extract a refinement target from the initial corresponding pixels based on an intensity difference between the initial corresponding pixels,
- determine a new corresponding pixel for the refinement target by using a calibration parameter, and
- perform binning on final corresponding pixels through a weighted average of the final corresponding pixels that are based on the new corresponding pixel.

19. The image processing apparatus of claim 12, wherein the first setting parameter indicates to use the single view in response to a demand for low power.

20. An electronic device comprising:
- an imaging device configured to generate an input array image of a multi-view through an array lens, the input array image comprising sub images corresponding to the multi-view; and
- a processor configured to:
  - determine a first setting parameter indicating whether to use the multi-view or a single view selected from the multi-view,
  - determine a second setting parameter indicating whether a priority is assigned to sensitivity enhancement based on pixel binning or to resolution enhancement based on pixel interpolation,
  - determine an image processing mode based on the first setting parameter and the second setting parameter, and
  - generate an output image by performing image processing on the input array image based on a processing procedure that is based on the determined image processing mode.

* * * * *